United States Patent [19]

Saxton

[11] 4,279,392
[45] Jul. 21, 1981

[54] ADJUSTABLE TIME-DELAYED APPARATUS FOR OPENING A PARACHUTE

[75] Inventor: Dennis M. Saxton, Santa Ana, Calif.

[73] Assignee: FXC Corporation, Santa Ana, Calif.

[21] Appl. No.: 68,704

[22] Filed: Aug. 22, 1979

[51] Int. Cl.$^3$ ............................................. B64D 17/58
[52] U.S. Cl. ...................................... 244/150; 74/3.5; 74/435; 368/10; 368/97
[58] Field of Search .................... 244/149, 150; 74/3.5, 74/422, 435, 437; 29/159.2; 368/10, 97, 101

[56] References Cited

U.S. PATENT DOCUMENTS

| | | | |
|---|---|---|---|
| 1,842,723 | 1/1932 | Lafayette et al. | 244/150 |
| 2,323,415 | 7/1943 | Overbury | 74/435 |
| 2,492,063 | 12/1949 | Quilter . | |
| 2,676,655 | 4/1954 | Hatfield . | |
| 2,833,498 | 5/1958 | Colt | 244/150 |
| 2,845,024 | 7/1958 | Greene | 244/150 |
| 3,249,328 | 5/1966 | Knowles . | |
| 3,523,708 | 8/1970 | Femia . | |
| 3,861,238 | 1/1975 | Christianson | 74/435 |
| 3,886,802 | 6/1975 | Mason | 74/3.5 |

Primary Examiner—Charles E. Frankfort
Attorney, Agent, or Firm—Gausewitz, Carr, Rothenberg & Edwards

[57] ABSTRACT

In a time-delayed device for opening a parachute, a spring-loaded cable is coupled to a cylindrical translational gear for conjoint movement. When the cable is released from a cocked position and spring-driven to a release position at which it opens the parachute, the translational gear is driven past the input gear of a gear train. As it moves, the translational gear engages and rotates the input gear along and through an effective gear engagement length which may be selectively varied by rotating the translational gear with respect to the input gear. An adjustable escapement contacts the gear train output gear and retards rotation of the input gear, and thus retards the rate of movement of both the translational gear and the cable, during engagement between the input gear and the translational gear through the selected effective engagement length. A time delay which varies directly with the effective engagement length selected is thereby interposed between the release of the cable and the opening of the parachute. By adjusting the retarding force of the escapement a range of delay times for a given selected engagement length is available. An aneroid control is employed to preclude movement of the cable toward its release position above a predetermined altitude.

40 Claims, 12 Drawing Figures

U.S. Patent Jul. 21, 1981 Sheet 1 of 6 4,279,392
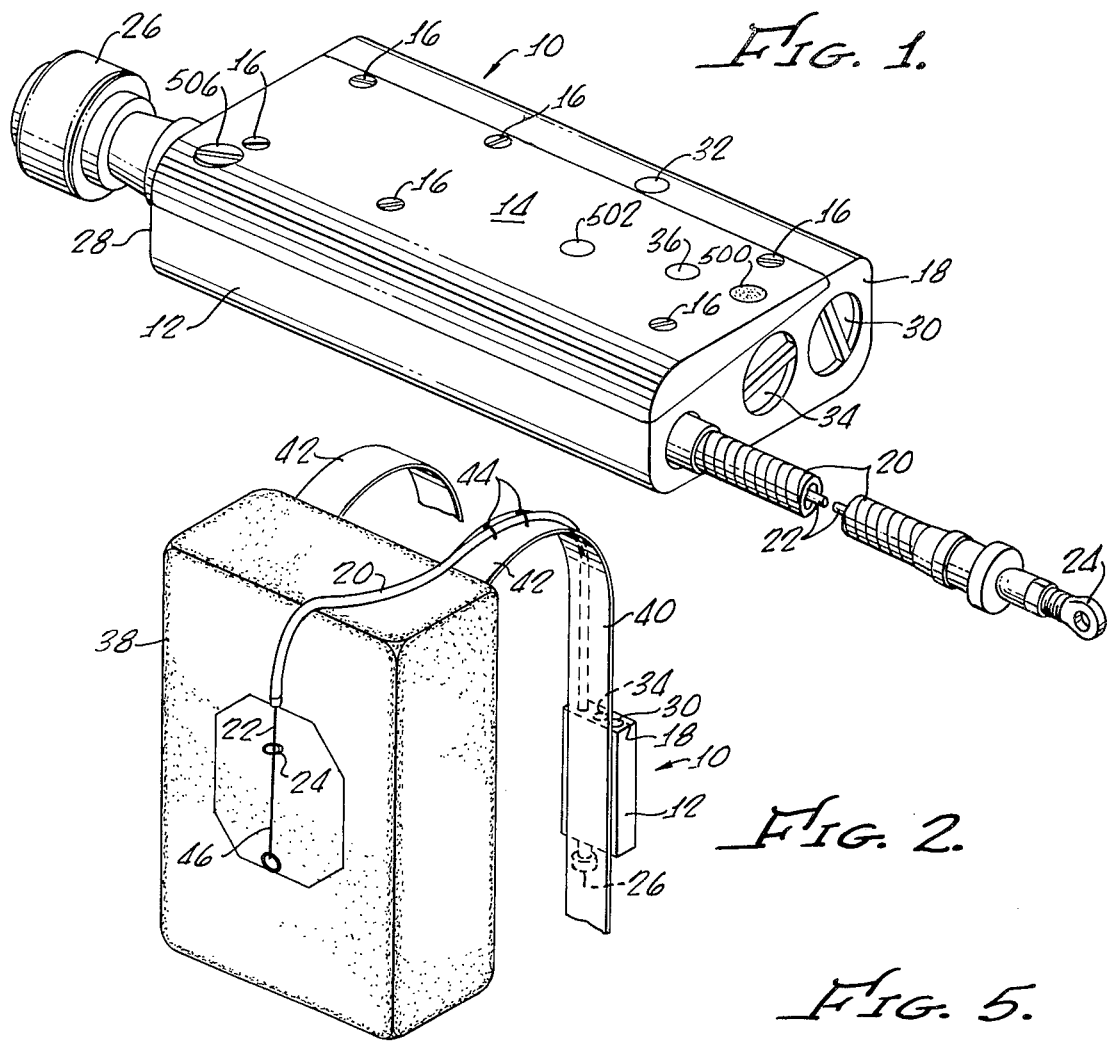
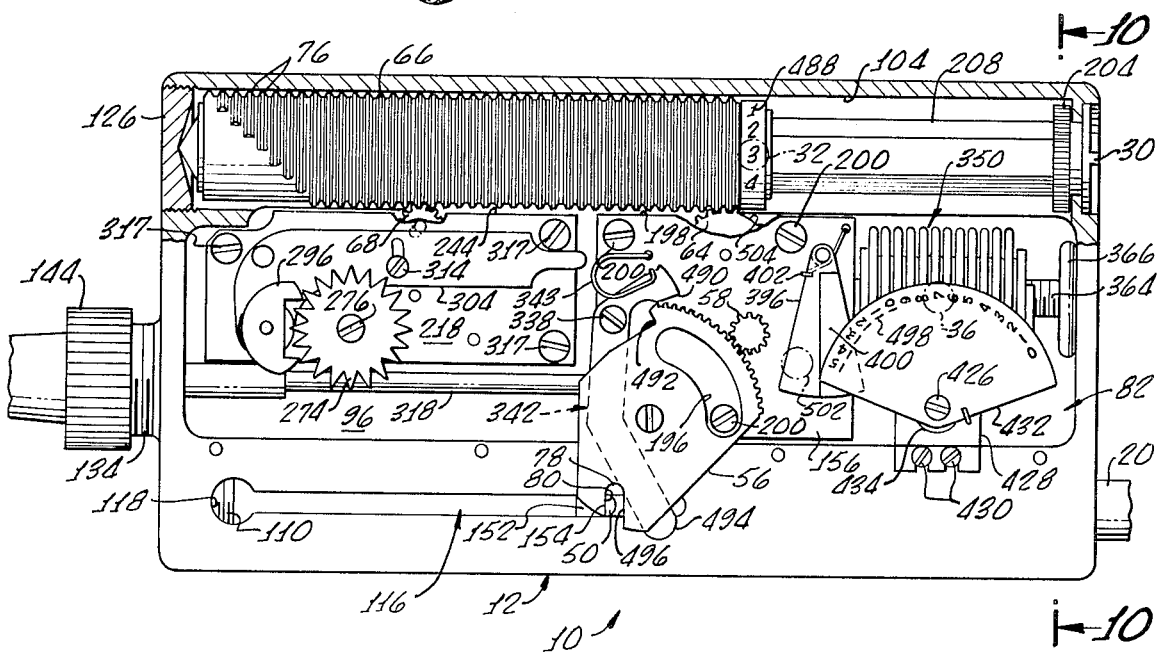

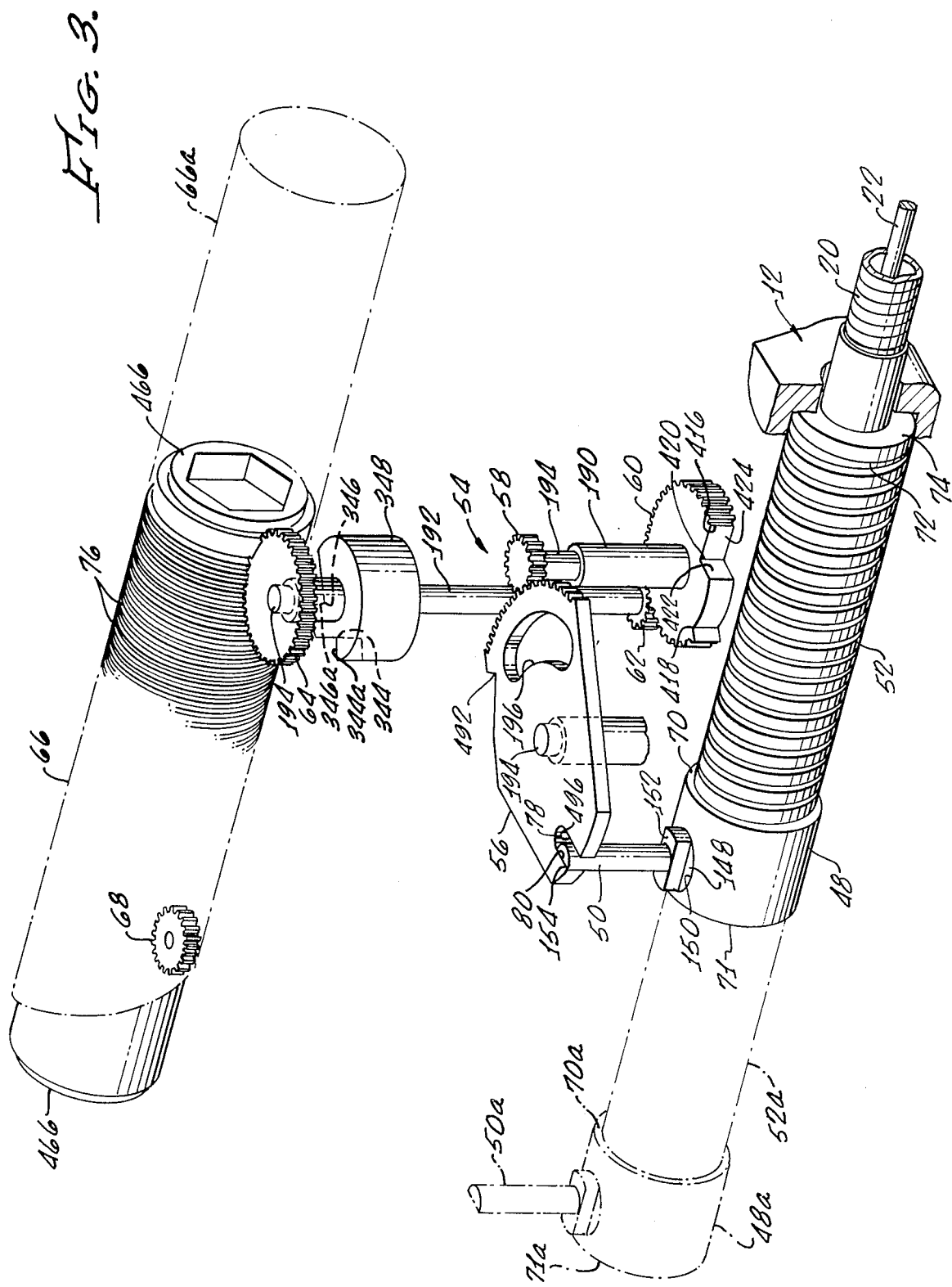

ADJUSTABLE TIME-DELAYED APPARATUS FOR OPENING A PARACHUTE

BACKGROUND OF THE INVENTION

This invention relates to mechanical timing devices, and more particularly to such devices for automatically opening a parachute in response to a parachute opening signal.

It has long been necessary or desirable in certain instances to delay the opening of a parachute for a predetermined time period subsequent to an opening signal, such as automatic ejectment of a pilot from an aircraft in an emergency situation, to allow sufficient clearance between the opening parachute and the passing aircraft. Additionally, and especially in modern high-altitude flights, it has proven desirable to automatically preclude the opening of the parachute above a predetermined altitude so that the wearer falls quickly through the frigid, low-oxygen higher altitudes, unretarded by the parachute.

Various types of timing devices, both mechanical and explosive, have been employed to interpose such a time delay between the opening signal and the opening of the parachute. However, none have proven to be entirely satisfactory.

Many prior art mechanical timing devices (whether in combination with barometric lockouts or not) have employed complex, bulky and expensive mechanisms which are driven by and retard the opening movement of a spring-loaded parachute release cable. A common mechanism includes a rack in one form or another that is linked with the cable and which, upon release of the cable from a cocked position, is driven by the cable. The movement of the rack (and thus the cable) is retarded by its continuous engagement during its movement with a retarding gear train controlled by an escapement, governor wheel, or the like. Such devices, however, have little, if any, time delay adjustment capability and thus are of limited value where a wide range of easily adjustable time delays is desired. For instance, some of the prior art mechanical devices, despite their complexity, have but a single time delay available. Other prior art devices provide only a limited range of adjustment capabilities and have, at best, only a relatively short maximum time delay potential. Even the prior art devices which provide such limited adjustment potential require rather tedious adjustment procedures ranging from partial disassembly of the timing device, repositioning the internal timing mechanism, and reassembly of the device, to repositioning several external components.

Additionally, few, if any, prior art mechanical timing devices provide for accurate calibration of the actual time delay selected. Thus, for instance, in a prior art timing device having only a fixed time delay available, a variance in actual time delay from one device to another is unavoidable due to manufacturing variances in components.

The very complexity of prior art mechanical timing devices has resulted in devices which are unnecessarily bulky, heavy and expensive to manufacture. Similarly, the complexity of such devices renders them inordinately difficult to service and repair in many instances.

In an attempt to overcome the various problems presented by mechanical timing devices, devices employing delayed-burning explosive cartridges instead of mechanical delay mechanisms have been employed. Such devices commonly utilize spring-driven firing pins which are activated by the parachute opening signal to fire the explosive cartridge. The cartridges used are of a slow-burning type which have a built-in (and nonadjustable) firing delay. Upon firing, the cartridge typically activates a gas-driven piston which, in turn, is linked to a member which opens the parachute. While such explosive type delay mechanisms have proven to be less expensive to produce than their mechanical counterparts, they carry with them their own unique shortcomings which, to a great extent, offset their relative advantages.

A prime disadvantage of such explosive type time delay devices is that a given cartridge simply cannot be tested (either to determine that it will indeed fire, or if so, at exactly what time interval it will fire after being struck by the firing pin) and then reused. Further, unlike some of the more sophisticated prior art mechanical devices, no adjustability as to time delay is afforded by a given cartridge. To vary the desired time delay, another cartridge having a longer or shorter fixed time delay must be inserted into the device. This usually requires, at best, at least a partial disassembly and reassembly of the time delay device to insert a different cartridge (which may or may not be available to the parachute's user during flight).

Additionally, while usually somewhat less complex than mechanical timing devices, the cartridge type device carries with it the undesirable feature and potential hazard of requiring the user to continuously carry the explosive close to his body during flight.

In summary, none of the prior art devices (whether mechanical or explosive type) provide a time delay apparatus which combines the characteristics of low cost, ease and range of time delay adjustment, light weight and compactness, and high reliability. Accordingly, it is an object of this invention to provide a mechanical time delay device that eliminates or minimizes above-mentioned problems.

SUMMARY OF THE INVENTION

In carrying out principles of the present invention, in accordance with a preferred embodiment thereof, parachute opening means are carried by a support for movement between a cocked position and a release position at which a parachute is opened by the opening means. Spring means urge the opening means toward the release position and latch means releasably lock the opening means in the cocked position, subsequently unlocking the opening means in response to a parachute opening signal. Barometric lockout means preclude movement of the opening means from the cocked positions toward the release position above a predetermined altitude. An adjustable delaying member is coupled, by linking means, to the spring-driven opening means for conjoint movement and is carried by the support for translational movement along a longitudinal axis of the delaying member. The delaying member has a variable engageable portion, defined by a longitudinally extending series of engagement members, which has an adjustable effective engagement length.

In a specific embodiment the delaying member is an elongated cylindrical gear having a longitudinally extending series of teeth extending partially around the circumference of the gear through progressively varying distances. As the delaying member is driven through its translational movement it passes retarding means, also carried by the support, which engage the delaying member along and through a selected effective engagement length, retarding the rate of motion of the delaying member during such engagement. Shifting means, carried by the support, allow the delaying member to be shifted to selectively vary its effective engagement length. During retardation of the delaying member's motion, the rate of motion of the opening means toward the release position is also retarded, the time of such retardation being directly related to the effective engagement length selected. Thus a selectively variable time delay may be interposed between the parachute opening signal and the opening of the parachute by the opening means.

BRIEF DESCRIPTION OF THE DRAWINGS

FIG. 1 is a perspective view of a parachute opener embodying principles of the present invention;

FIG. 2 is a schematic perspective view of the parachute opener illustrated in FIG. 1 attached to a packed parachute and ready for use;

FIG. 3 is a simplified perspective view illustrating interaction among portions of parachute opening, linking, and time delay mechanisms used in a parchute opener of the present invention;

FIG. 5 is an enlarged top plan view of the parachute opener of FIG. 1 with its cover plate removed and with portions of its housing and certain components therein cut away for clarity, the components being shown in a cocked position;

DETAILED DESCRIPTION

General Structure and Operation

Figure 4:
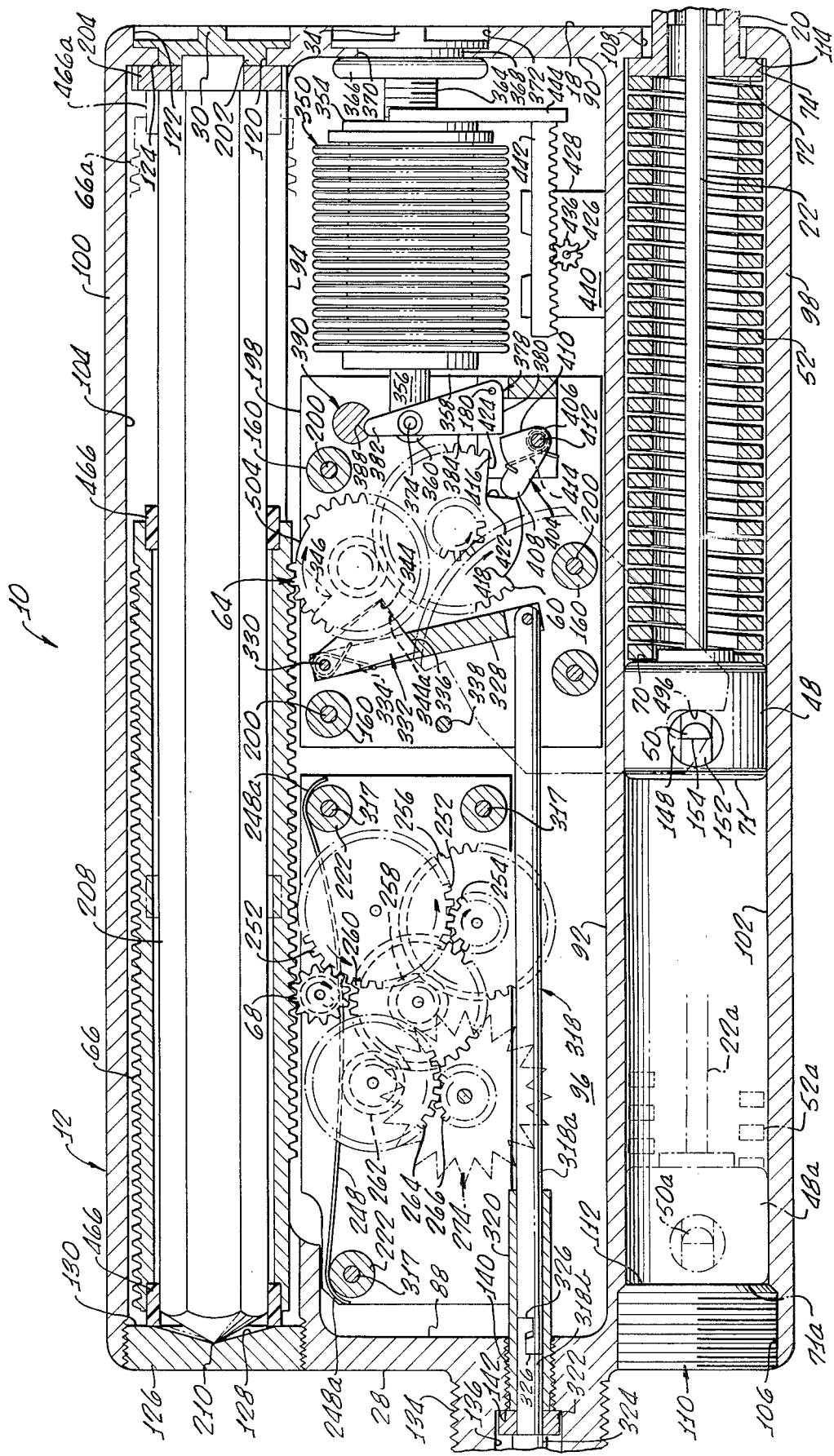
FIG. 4 is an enlarged cross-sectional view taken along line 4—4 of FIG. 10.

Illustrated in FIGS. 1 and 2 and designated generally by the reference numeral 10 is a parachute opener embodying principles of the present invention. Referring to FIG. 1, the parachute opener 10 includes a compact, elongated housing or support 12 to which a cover plate 14 is removably secured by screws 16. Extending from within the housing 12 outwardly through an end 18 thereof, and then through a flexible sheath 20 projecting from the housing end 18 is a springloaded parachute release cable 22 that has an eyed ripcord attachment member 24 fixed to its outer end. By pulling the member 24 outwardly (i.e., to the right in FIG. 1) the release cable 22 is moved through the sheath (against a strong force exerted by the cable's spring as described below) to a cocked position at which it is automatically and releasably locked by a latch mechanism (described below) within the housing 12. With the release cable 22 in its cocked position, the member 24 is attached to the ripcord of a packed parachute. When it is desired to deploy the parachute, an opening signal is transmitted to the parachute opener by pulling an actuator knob 26 (projecting from an opposite end 28 of the housing 12) outwardly (i.e., to the left in FIG. 1). This releases the internal latch mechanism and allows the cable 22, and thus the member 24, to be jerked sharply inwardly (i.e., to the left in FIG. 1)—pulling the ripcord and opening the parachute.

As more fully described below, a novel mechanism within the housing 12 allows a selectively variable time delay to be interposed between the opening signal and the actual opening of the parachute by the cable 22. By simply adjusting a dial 30 on the housing end 18 a wide range of time delays (including zero) may be selected—the actual time delay selected appearing in a viewing window 32 in the housing 12. In addition to and independent of the time delay feature of the parachute opener 10, a barometric lockout mechanism is provided within the housing 12 that precludes a releasing motion of the cable unless the parachute opener 10 is below a predetermined lockout altitude. A wide range of lockout altitudes (including zero or "sea level") may be selected by simply adjusting a dial 34 on the housing end 18—the actual lockout altitude selected appearing in a viewing window 36 in the cover plate 14.

FIG. 2 shows the parachute opener 10 attached to a typical packed parachute 38 and ready for use. With the parachute opener cocked as previously described the housing 12 is secured to the front surface of a shoulder strap 40 on a parachute harness 42 attached to the parachute 38, with the actuator knob 26 facing downwardly (where it may be easily grasped and pulled by the parachute's wearer), and the viewing windows 32, 36 facing outwardly. From the housing end 18 the flexible sheath 20 extends upwardly along the strap 40 (to which it is secured by, for example, strap loops 44), over the top of the parachute 38 and then downwardly toward a ripcord 46 (on the back of the parachute), to which the member 24 is attached. Thus, to open the parachute 38 the knob 26 is pulled downwardly causing the ripcord 46 to be pulled sharply upwardly by the member 24—after the selected time delay and subject to the barometric lockout as previously described.

FIG. 3 illustrates some of the major components of parachute opening, time delay, and linking mechanisms carried within the housing 12 and forms the basis for the following general description of the inner structure and operation of the parachute opener 10. These components are shown in FIG. 3 in a cocked position to which they are moved (in a manner described below) by the outward pulling to the cocked position of the member 24.

Within the housing 12 and having functions described below are parachute opening means including a cylindrical member or initiator 48 which carries an upwardly projecting pin 50; spring means in the form of a strong compression or main drive spring 52; linking means including a linking gear train 54 having an input or sector gear 56, successive intermediate gears 58, 60 and 62, and an output gear 64; and adjustable time delay means including a delaying member in the form of a translational gear 66 and retarding means in the form of an escapement-controlled retarding gear train (not shown in FIG. 3) having an input gear 68.

The initiator 48 is fixed to the inner end of the cable 22 and is carried within the housing 12 for translational movement between the cocked position (indicated by solid lines in FIG. 3) and a release position (to the left in FIG. 3 and indicated by dashed lines and reference numeral subscripts "a"). Movement of the initiator 48 from its cocked position to the release position causes the cable 22 to be pulled inwardly to an extent sufficient to open the parachute as previously described. Such releasing movement is strongly urged by the spring 52 (compressed in the cocked position shown) which circumscribes the cable 22 and engages an end 70 of the initiator 48 and an opposed surface 72 of an end flange 74 of the sheath 20 that is retained within the housing 12.

The translational gear 66 is carried for movement along its longitudinal axis between a first position (indicated by solid lines in FIG. 3) and a second position (to the right in FIG. 3 and indicated by dashed lines), the gear in such second position being given the reference numeral 66a. Extending longitudinally along the gear 66 is a series of laterally projecting engageable members or teeth 76.

The initiator pin 50 and the gear 66 are coupled for conjoint movement by the linking gear train 54, the pin 50 being received in an open-ended slot 78 in the input gear 56 and bearing against a slot side surface 80 and the output gear 64 being interengaged with gear teeth 76 near the right end of the gear 66 in the cocked position shown. Additionally, the input gear 68 of the retarding gear train is interengaged with gear teeth 76 along an intermediate portion of the translational gear 66.

As described below, the linking gear train 54 is releasably locked in the cocked position shown by latch means (not shown in FIG. 3) coupled to the actuator knob 26 and, above the selected lockout altitude, by barometric lockout means (also not shown in FIG. 3), which in turn releasably locks the pin 50, the initiator 48 and the gear 66 in the cocked position indicated. When the actuator knob 26 is pulled outwardly, and the parachute opener 10 is below the lockout altitude, the linking gear train 54 is freed from these restraints and its gears are permitted to rotate. This in turn allows the initiator 48 and its pin 50 to be spring-driven toward the release position, the pin 50 rotating the input gear 56 in a clockwise direction, causing the output gear 64 to be rotated in a clockwise direction (as viewed from the top in FIG. 3) which drives the gear 66 toward its second position in turn causing a clockwise rotation of the input gear 68.

During an initial portion of the releasing motion of the initiator 48 and its pin 50, the gear 66 is driven rightwardly (in FIG. 3) past the input gear 68 and out of engagement with it and thence to its second position. When the gear 66 reaches its second position, the input gear 56 has been rotated clockwise to a position in which the pin 50 is released from the slot 78 and the initiator 48 completes its spring-urged releasing motion which opens the parachute. When the linking gear train 54 is unlocked, this releasing motion and the movement of the gear 66 to its second position occurs substantially instantaneously (in the absence of rotational restraint on the input gear 68 as described below) due to the strong force of the spring 52. However, as also described below, an adjustable rotational retarding force may be imposed upon the input gear 68 to retard the rate at which the gear 66 moves toward its second position during its engagement with the gear 68, thus delaying the releasing movement of the initiator 48 as well. Additionally, a novel feature of the gear 66 allows the effective engagement length through which it engages the input gear 68 to be selectively varied, thus permitting an adjustable time delay to be interposed between the opening signal and the actual opening of the parachute.

Detailed Description—Structure

Figure 10:
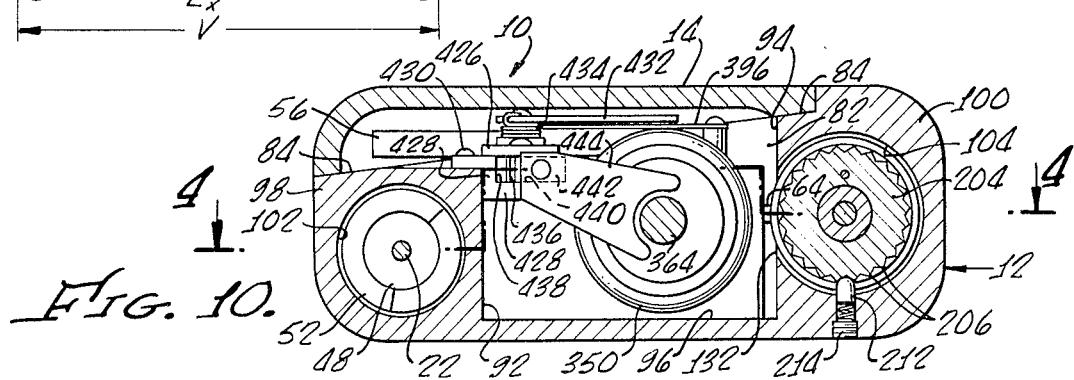
FIG. 10 is an enlarged cross-sectional view taken along line 10—10 of FIG. 5.

Referring to FIGS. 4 and 10, an elongated, generally rectangular recess 82 in an upper housing surface 84 extends longitudinally along a central lateral portion of the housing 12, forming inner housing surfaces 88, 90, 92, 94 at the ends and sides of the recess 82 and forming an inner housing surface 96 at its bottom. Adjacent the sides of the recess 82 are longitudinally extending housing side portions 98, 100 that contain, respectively, longitudinally extending bores 102, 104.

Extending inwardly through housing ends 18, 28 and communicating with opposite ends of the bore 102 are bores 106, 108. Bore 106 has a diameter somewhat greater than that of the bore 102, is internally threaded, and has an externally threaded end plug 110 removably secured therein, the end plug having an inner end surface 112. Bore 108 has a diameter somewhat less than that of the bore 102 and forms an interior shoulder 114 at its juncture therewith. An elongated slot 116 (see FIG. 5), above and parallel to the bore 102 and having an enlarged circular end portion 118 adjacent the left end of the bore 102, extends inwardly through the upper housing surface 84, communicating with the bore 102.

Extending inwardly from the housing end 18 (FIG. 4) and communicating with an inner end of the bore 104 is a reduced diameter bore 120 (having a counterbore 122) forming an interior shoulder 124 at its juncture therewith. Adjacent housing end 28 the bore 104 is internally threaded and has an externally threaded end plug 126 removably secured therein, the end plug having a generally conical recess 128 in its inwardly facing surface 130. The bore 104 communicates with the housing recess 82 through an opening 132 (FIG. 10) through the inner housing surface 94 which extends longitudinally along substantially the entire length of the bore 104.

Projecting outwardly from the housing end 28 is an externally threaded cylindrical attachment member 134 (FIG. 4) having a longitudinal bore 136 extending inwardly from its outer end. A smaller, internally threaded bore 140 extends inwardly from the inner termination of the bore 136 communicating with the housing recess 82 and forming an interior shoulder 142 at its juncture with the bore 136. A cylindrical, internally threaded cap 144 (FIGS. 11 and 12) having an opening (not shown) in its outer end 145 is threaded onto the outer end of the member 134.

The initiator 48 (FIG. 4) is mounted within the bore 102 for movement between the cocked position (indicated by solid lines in FIG. 4) and the release position (indicated by dashed lines and reference numeral subscripts "a" in FIG. 4) as previously described. The spring 52 is also contained within the bore 102, circumscribing the inner end portion of the cable 22 and contacting the initiator surface 70 and the sheath flange 74, also as previously described. The sheath end flange 74 abuts and is retained within the bore 102 by the interior shoulder 114, with the sheath 20 circumscribing the cable 22 and extending outwardly through the bore 108.

A cylindrical pin carrying member 148 (FIG. 3) is removably received in a downwardly extending radial bore 150 in the initiator 48, the member 148 having a length substantially equal to the depth of the bore 150. Affixed to and projecting upwardly from the upper end of the member 148 is an elongated, generally rectangular guiding member 152 having flat side surfaces and a width slightly less than that of the slot 116. The member 152 projects upwardly through the slot 116 and is slidably received therein as indicated in FIG. 5.

The upwardly projecting pin 50 is fixed at its lower end to the guiding member 152 (FIG. 3) and has a longitudinally extending flat surface 154 which faces the end plug 110 and is perpendicular to the longitudinal extent of the guiding member 152. The flat surface 154 is thus perpendicular to the longitudinal axis of the bore 102 as well, and is maintained in such orientation by the slot 116 which precludes rotation of the guiding member 152 and pin 50.

The input gear 56 (FIG. 5) of the linking gear train 54 is carried at a level above the upper housing surface 84 (in a manner described below) with the gear slot surface 80 being positioned above and perpendicular to the housing slot 116 (thus parallel to the flat pin surface 154) when the gear 56 is in the cocked position shown in FIG. 5, the slot surface 80 being engaged by an upper portion of the flat pin surface 154 (FIG. 3). It should be noted that although the pin 50 could be cylindrically shaped, it is preferred to flatten its gear contacting surface 154 to broaden the contact area between the pin 50 and the gear slot surface 80 to preclude potential deformation of the slot surface by the pin (which transmits a considerable spring force to the slot surface in the cocked position).

Figure 6:
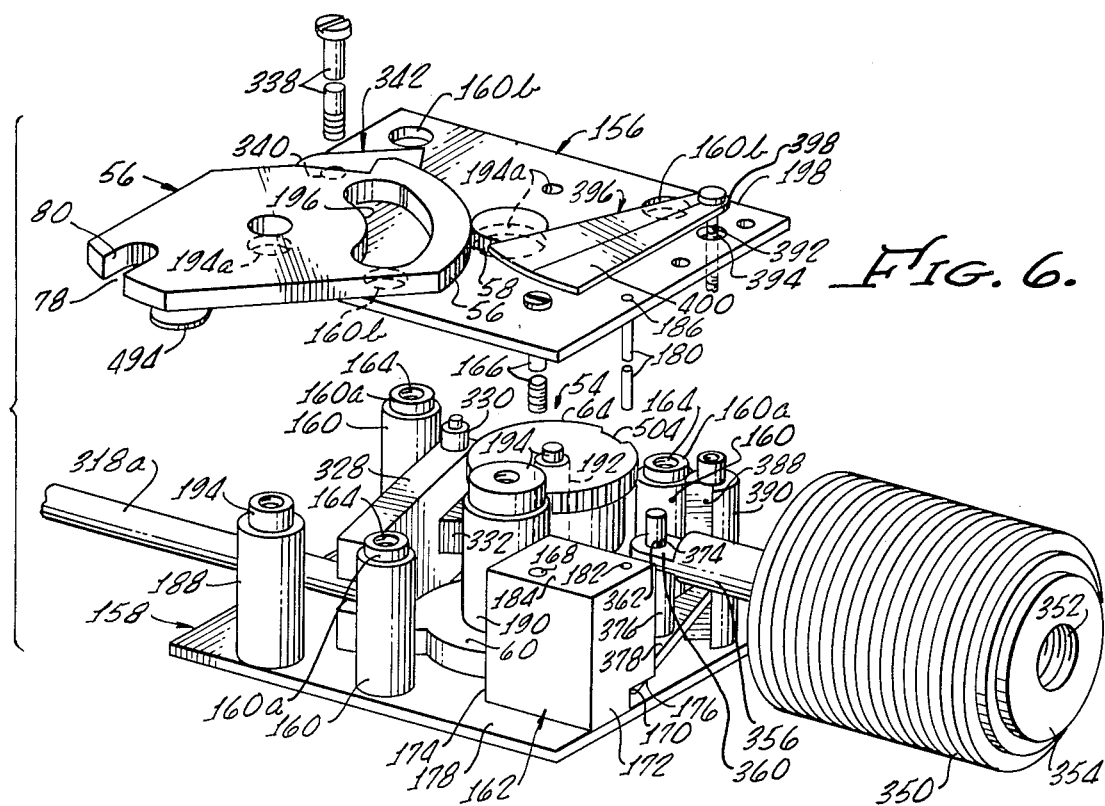
FIG. 6 is a partially exploded perspective view of linking means and portions of latching and barometric lockout mechanisms used in a parachute opener of the present invention.

Referring now to FIGS. 3 and 6, the linking gear train 54 is modularly constructed, being carried by parallel upper and lower module plates 156, 158 (FIG. 6) which are attached and spaced apart by perpendicular cylindrical support pillars 160 and by a support block 162. The pillars have end portions 160a that are press-fitted into corresponding openings 160b through the module plates. A longitudinal bore 164 extends completely through each of the pillars. The support block 162 is secured between the plates 156, 158, by a screw 166 which passes downwardly through upper plate 156, through a circular bore 168 through block 162, and is threaded into the lower plate 158. A rectangular corner notch 170 is cut into support block 162 at its lower end and extends between its side surfaces 172, 174, forming an undersurface 176 parallel to and above the upper surface 178 of the lower plate 158. A pin 180 passes through a circular bore 182 extending between the upper surface 184 of the block 162 and the undersurface 176 of the notch. The ends of the pin 180 are press-fitted into circular openings 186 in the module plates 156, 158.

The gears in the linking gear train 54 (FIG. 6) are fixed to rotatably mounted cylindrical spindles 188, 190, 192 (which extend perpendicularly between the parallel plates 156, 158) for rotation therewith, each of the spindles having reduced cylindrical end portions 194 that are journalled in corresponding circular openings 194a through the module plates. The input gear 56 is carried above the upper plate 156 and is fixed to the upper end portion 194 of the spindle 188 which projects above the upper plate 156. An arcuate slot 196 is formed in the input gear 56 to permit access to the upper end of the support pillar 160 below the gear for a purpose described below. The intermediate gear 58 which is engaged by the sector gear 56 is also carried above the upper plate 156 and is fixed to the upper end 194 of the spindle 190 which projects above the upper plate 156. The intermediate gear 60 is also fixed to the spindle 190. The output gear 64 is fixed to the spindle 192 adjacent the lower surface of the upper plate 156 and projected slightly outwardly of an edge 198 of the upper plate 156 as may best be seen in FIG. 4.

The linking gear train module is removably secured (within the housing recess 82) as a unitary assembly to the lower inner housing surface 96 with the lower module plate 158 facing downwardly, the input gear 56 positioned over the slot 116 (FIG. 5) as previously described, and the output gear 64 projecting slightly into the bore 104 through the opening 132 (FIG. 10) by screws 200 (FIG. 5) which pass downwardly through the support pillar bores 164 and into threaded openings (not shown) in the inner housing surface 96. Access to the screw 200 below input gear 56 is provided through the arcuate slot 194 in gear 56. The translational gear 66 is carried within the bore 104 (in a manner described below) and is engaged by the output gear 65 (FIGS. 5 and 10) in the manner previously described.

The adjusting dial 30 is recessed into the counterbore 122 (FIG. 4) and has a cylindrical end member 202 which is rotatably received within and extends inwardly through the bore 120. Fixed to the inner end of the member 202 for rotation therewith is a cylindrical locking member 204 within the bore 104 adjacent the interior shoulder 124 which has a circumferentially extending series of radial grooves 206 (FIG. 10). Fixed to the member 204 for rotation therewith, and extending therefrom longitudinally through the bore 104 to the end plug 126 is an elongated guiding member 208 (FIG. 4) having a hexagonal cross-section and a pointed end 210 which is rotatably received in the center of the conical recess 128 of the end plug 126. The cylindrical gear 66 is slidably but nonrotatably mounted on the guiding member (or gear shifting means) 208 (in a manner described below) for translational movement. For purposes described below, the guiding member 208 (and thus the gear 66) may be rotated to an adjusted rotational position (by turning the dial 30) at which position it is automatically and releasably locked by a spring-loaded detent 212 (FIG. 10) which engages one of the radial grooves 206 in the locking member 204, the detent being retained within the housing 12 by a threaded insert 214 in bottom of the housing.

Figure 7:
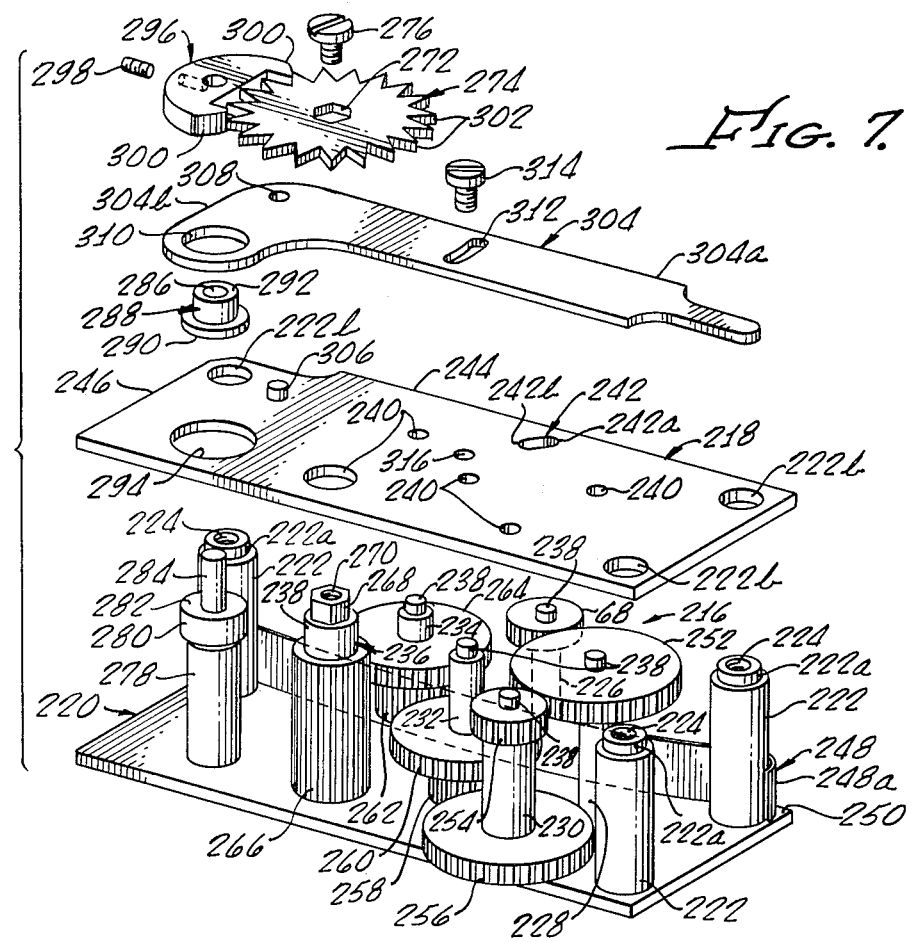
FIG. 7 is a partially exploded perspective view of an escapement-controlled retarding gear train used in the present invention, with certain gear teeth shown schematically for clarity.

Referring to FIG. 7, the retarding gear train 216, like the linking gear train, is modularly constructed, being carried by parallel upper and lower module plates 218, 220, which are attached and spaced apart by cylindrical pillars 222. The pillars have reduced cylindrical portions 222a at their ends which are press-fitted into corresponding circular openings 222b through the module plates. A longitudinal bore 224 passes entirely through each of the pillars.

The gears of the retarding gear train 216 are fixed to rotatably mounted cylinderical spindles 226, 228, 230, 232, 234, 236 (which extend perpendicularly between the parallel module plates 218, 220) for rotation therewith, each of the spindles having cylindrical end portions 238. Each end portion of the spindles 226, 228, 230, 232, 234, and the lower reduced end portion of the spindle 236 are journalled in corresponding circular openings 240 through the module plates. The upper end portion of the spindle 226, however, is rotatably and slidably received in a slot 242 through the upper module plate 218. Slot 242 has a first curved end 242a adjacent an edge 244 of the plate 218 and extends from curved end 242a toward an end 246 of the plate 218 along a line forming an acute angle with plate edge 244. The slot terminates at a second curved end 242b. Because the slot 242 permits the upper end portion 238 of the spindle 226 to move from end 242a to end 242b of the slot 242, the spindle 226 is not restrained in a perpendicular position with respect to the parallel plates 218, 220 (unlike the rest of the spindles). With the upper end portion of the spindle 226 contacting curved end 242a, however, the spindle 226 is in a perpendicular position. A flat spring 248 (which may be seen more clearly in FIG. 4) has curved ends 248a which partially encircle the two support pillars 222 adjacent an edge 250 of the lower plate 220 and passes inwardly of the spindle 226, biasing the spindle and its upper end portion toward the curved end 242a of the slot 242.

The input gear 68 is fixed to the spindle 226 and projects outwardly of edge 244 of the upper module plate 218 (as indicated in FIG. 5). A first intermediate gear 252 is fixed to the spindle 228 and is engaged by the input gear 68. Second and third intermediate gears 254, 256 are fixed to the spindle 230 with the second intermediate gear being engaged by the first intermediate gear. Fourth and fifth intermediate gears 258, 260 are fixed to the spindle 232, with the fourth intermediate gear being engaged by the third intermediate gear. Sixth and seventh intermediate gears 262, 264 are fixed to the spindle 234, with the sixth intermediate gear being engaged by the fifth intermediate gear. An eighth intermediate gear 266 is fixed to the spindle 236 and is engaged by the seventh intermediate gear.

The top end portion 238 of the spindle 236 passes entirely through its circular opening 240 in the top plate 218 and extends above the upper plate. Fixed to and extending upwardly from the upper end portion 238 of the spindle 236 is an hexagonal pin 268 containing a threaded axial bore 270 in its outer end. The hexagonal pin 268 is received in a corresponding hexagonal opening 272 extending axially through an output sprocket gear 274 of the retarding gear train, with the underside of the output gear 274 contacting the upper end portion 238 of the spindle 236, thus positioning the output gear 274 above the upper module plate 218. The hexagonal pin 268 and the opening 272 preclude relative rotation between the sprocket 274 and the spindle 236, and the output gear 274 is axially retained on the spindle 236 by a retaining screw 276 received by the threaded opening 270 in the hexagonal pin 268.

It can be seen in FIG. 7 that when the input gear 68 is rotated in a clockwise direction, the output or sprocket gear 274 is driven in a counterclockwise direction. In the embodiment of the retarding gear train illustrated herein a reduction of approximately 16 to 1 is obtained between the output gear 274 and the input gear 68—i.e., when the input gear 68 is rotated through one revolution the output gear 274 is driven through approximately 16 full revolutions.

A cylindrical spindle 278 is journalled at its lower end to the lower module plate 220 in a manner similar to that of the other spindles previously described, and has, at its upper end, an enlarged cylindrical portion 280 having an upper surface 282. Extending upwardly from the surface 282 is an elongated pin 284, which is rotatably received in a longitudinal bore 286 through a cylindrical bushing 288. The bushing has a lower end flange 290 which abuts the upper spindle surface 282, the upper end of the pin 284 projecting above an upper end surface 292 of the bushing. The bushing 288 projects upwardly through an enlarged circular opening 294 in the upper module plate 218. The opening 294 has a diameter substantially larger than that of the bushing 288 and this allows the spindle 278 to be tilted away from a vertical position.

A rate-controlling escapement cam 296, carried above the upper module plate 218 for engagement with the sprocket 274, is pivoted on the upper end of the pin 284 and is locked thereto by means of a screw 298. Escapement cam 296 has cam projections 300 which alternatively engage teeth 302 on sprocket 274 as the latter is rotatably driven by the input gear 68 via the intermediate gears of the retarding gear train 216, thus causing the escapement cam to oscillate so as to cause one or the other of its cam teeth or projections 300 to contact the sprocket teeth 302. The depth of engagement of the cam teeth with the sprocket teeth is selectively adjustable, and thus the rate of rotation of the retarding gear train is adjustable, by means of a bell crank lever or retarding member 304 having a long arm 304a and a short arm 304b generally perpendicular thereto. The lever 304 is carried at a level above the upper module plate 218 and below the cam 296 and sprocket 274 and is pivoted to the upper plate upon a pin 306, fixed to the upper plate and received in an opening 308 in the lever 304 adjacent the juncture of its arms. The short arm 304b of the lever 304 has an aperture 310 that rotatably receives an upper portion of the bushing 288. The lever 304 is angularly shifted about its pivot pin 306 to tilt the spindle 278 in the opening 294 and thus drive escapement cam 296 radially toward or away from sprocket 274 by manually pivoting the long leg 304a. Leg 304a has an arcuate slot 312 that receives a headed locking screw 314 threaded in an aperture 316 of the upper plate 218 to hold the lever 304 and escapement cam 296 in a desired adjusted position.

The retarding gear train module is removably secured (within the housing recess 82) as a unitary assembly to the inner housing surface 96 (FIG. 5), with the lower module plate 220 facing downwardly and the input gear 68 projecting slightly into the bore 104 and engaging the cylindrical rack 66 by screws 317 (FIG. 5) passing downwardly through the pillar openings 224 and threaded into openings in the inner housing surface 96.

Referring now to FIGS. 1, 3, 4, 11 and 12, the latch means, which as previously stated are adapted to releasably lock the linking gear train (and thus the gear 66 and initiator 48) in the cocked position shown in FIGS. 3 and 4, include a cylindrical latch rod 318 (FIG. 4) having one end fixed to the actuator knob 26 exterior to the housing 12 and extending therefrom through the end opening of cap 144 (FIG. 11), through bore 136 (FIG. 4) and then into the housing recess 82 through a guiding sleeve 320 threaded into bore 140, an end flange 322 of the guiding sleeve 320 abutting the interior shoulder 142. An enlarged cylindrical portion 324 of the latch rod 318 abuts the flange 322, thus limiting the inward travel of the latch rod when the actuator knob 26 is pushed inwardly. The latch rod is formed in two sections 318a, 318b, which are releasably joined by means of interengageable cammed ends 326 positioned within the guiding sleeve 320 to aid in disassembly and removal of the parachute opener's internal components.

The inner end of the latch rod 318 is pivoted to one end of a latch arm 328 (FIG. 4). The opposite end of the latch arm 328 is fixed to a pin 330 (FIG. 6) extending between and journalled at its ends to the module plates 156, 158. Pivoted to the pin 330 is one end of an engaging member 332 which is biased in a counterclockwise direction by a spring 334 (FIG. 4) and has a flat opposite end surface 336.

By pushing the knob 26 fully inwardly, the latch arm 328 is pivoted to a position illustrated in FIG. 4. By pulling the knob 26 outwardly, the latch arm 328 is pivoted in a clockwise direction until it contacts and is stopped by a screw 338 (FIGS. 4, 6 and 11) which passes downwardly through an aperture 340 (FIG. 6) in a catch member 342 (whose function is described below) and thence through an opening (not shown) in the upper module plate 156 and is threaded into the bottom module plate 158.

With the knob 26 pushed fully inwardly, the engaging member 332 is brought to a position (FIG. 4) in which it may be spring-urged into engagement with a first notch 344 or a second notch 346 (FIGS. 3 and 4) in a cylindrical member 348 (FIG. 3) fixed to the spindle 192 below the output gear 64, with its flat surface 336 contacting flat notch surface 344a or 346a. Such engagement of either of the notches 344, 346 precludes clockwise rotation of the member 348 thus also precluding clockwise rotation of the output gear 64 and the sector gear 56. However, even with the knob 26 pushed fully inwardly a counterclockwise rotation of the member 348, output gear 64 and sector gear 56 (which occurs, as described below, during cocking of the parachute opener) is not precluded by the engagement member 332, the cylindrical member 348 merely camming the engagement member 332 in a clockwise direction against the force of its spring 334 as the cylindrical member 348 rotates in a counterclockwise direction.

Figure 12:
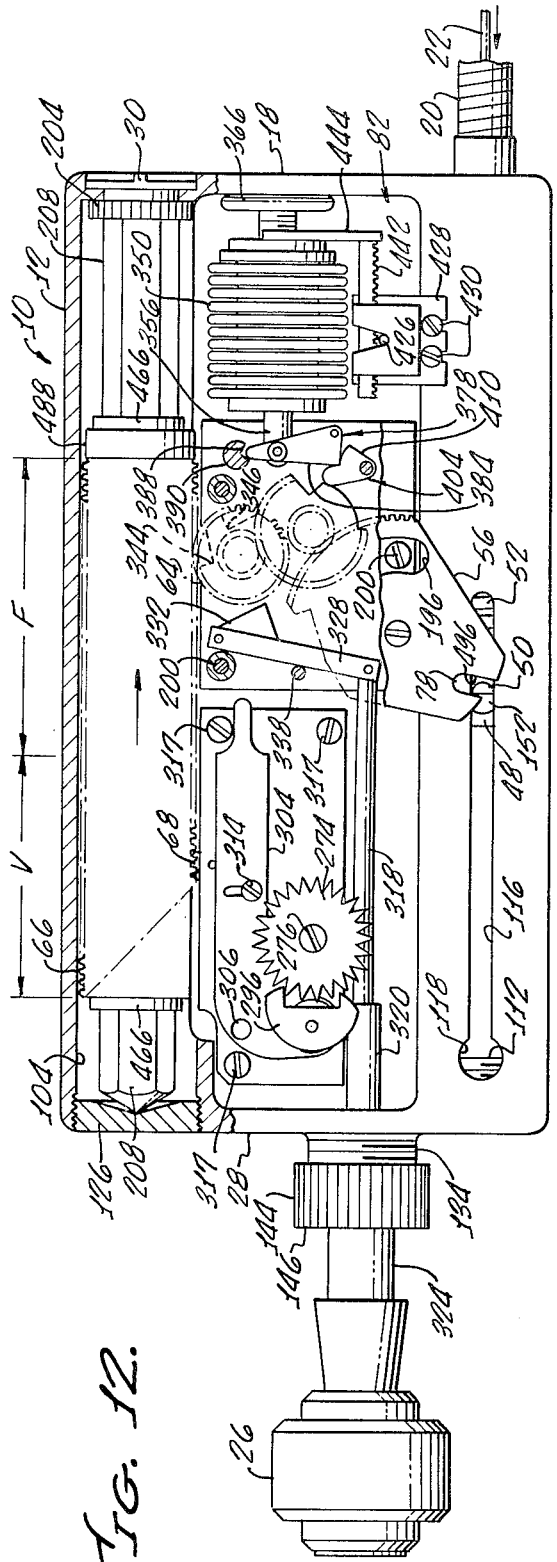
FIG. 12 is another view similar to that of FIG. 5, but with the components shown in positions reached at a point in time subsequent to unlocking the release cable from the cocked position.

With the knob 26 pulled fully outwardly (as seen in FIG. 12), the engagement member 332 is moved to a position in which it cannot contact the cylindrical member 348 (or its notches) during either clockwise or counterclockwise rotation thereof.

Referring now to FIGS. 4, 5, 6, 10, 11 and 12, the barometric lockout means, which as previously stated preclude actuation of the parachute opening 10 above a selected lockout altitude, include an aneroid 350 which is contained within the housing recess 82. The aneroid has a threaded opening 352 (FIG. 6) in a first end 354 and a pin 356 projecting from an opposite end 358, the pin having a flattened outer end portion 360 with a circular opening 362 therethrough. Aneroid 350 is supported at its first end 354 by an adjusting screw 364 (FIG. 4), threaded into the opening 352, the outer end of the adjusting screw being secured to a disc 366 within the housing recess 82 adjacent inner housing surface 90. A cylindrical projection 368 on the adjusting dial 34 is rotatably received in a bore 370 (having a counterbore 372) through the housing end 18 and is fixedly attached to the disc 366, the dial 34 being recessed in the counterbore 372.

The aneroid pin opening 362 rotatably receives a pin 374 projecting upwardly from the upper end of a cylindrical member 376 (FIG. 6) whose lower end is fixed to an upper surface of a first gear locking member 378 (FIG. 4) having first and second ends 380, 382 and a flat edge surface 384 extending therebetween. The first end 380 is positioned beneath the support block notch surface 176 and is pivoted to the pin 180 (FIGS. 4 and 6) which extends between the module plates 156, 168, through the support block 162 and upper notch surface 176. The first end 380 of the locking member 378 is biased upwardly against the notch surface 176 by a spring (not shown) which circumscribes the lower end of the pin 180 and engages the lower surface of the locking member end 380 and the upper surface of the lower module plate 158.

The second end 382 of the first locking member 378 is received in a longitudinally extending notch 388 in a cylindrical spindle 390 (FIG. 6) which extends between and is journalled at its ends to the module plates 156, 158. An elongated pin 392 (FIG. 6) is fixed to the upper end of the spindle 390 and projects upwardly through an opening 394 in the upper module plate 156. Aneroid leak indicating means (operating in a manner described below), in the form of a leak indicating member 396 (FIG. 6) are carried above the upper module plate 156, a first end 398 of the member 396 being fixed to the upper end of the pin 392 for rotation therewith. The upper surface of the lead indicating member 396 has a brightly colored leak indicating section 400, which operates to signal an aneroid leak in a manner described below. A spring 402 (FIG. 5) biases member 396 in a counterclockwise direction.

Also under the support block notch surface 176 (FIG. 6) is a second gear locking member 404 (FIG. 4) having first and second ends 406, 408 and a flat edge surface 410 adjacent the first end which extends therefrom towards the second end at an acute angle to a line between the first and second ends. The first end 406 is pivoted to the lower module plate 158 by a pin 412, the second locking member 404 being carried at the same level as the first locking member 378 and being biased in a counterclockwise direction by a spring 414 (FIG. 4). As can be seen in FIGS. 3 and 4, the intermediate gear 60 has a nontoothed section extending circumferentially from a first point 416 clockwise to a second point 418. Adjacent the first point 416 is a radially extending notch 420 having perpendicular surfaces 422 and 424.

When the parachute opening 10 is in the cocked position (FIG. 4) and above the selected lockout altitude, the first and second locking members 378, 404 are driven (in a manner described below) to the position indicated in FIG. 4. The second end 408 of the second locking member 404 contacts the notch surface 422 of the intermediate gear 60 and the flat surfaces 384, 410 of the first and second locking members overlap by a small amount. It can be seen that even if the engagement member 332 is disengaged from the linking gear train (i.e., by pulling the actuator knob 26 outwardly in an attempt to activate the cocked parachute opener) counterclockwise rotation of the intermediate gear 60 (urged by the actuator pin 50) is precluded by the interaction between the first and second locking members 378, 404. A counterclockwise torque on the gear 60 causes a clockwise torque on the second gear locking member 404. However, the second locking member 404 is precluded from clockwise rotation by the resulting force at a small overlap between surfaces 384 and 410 which is directed substantially toward the pin 180. (Thus a large force may be resisted by a relatively small force on the aneroid pin 356). Thus, with the locking members 478, 404 in the position indicated in FIG. 4, actuation of the parachute opener is precluded.

The lower end of a spindle 426 (FIGS. 5, 10, 11 and 12) is journalled to a support member 428 which is attached to the housing 12 by screws 430. Fixed to the upper end of the spindle 426 and carried above the upper housing surface 84 is a lockout altitude indicating member 432 (FIG. 5) which is biased in a counterclockwise direction by a spring 434 (FIGS. 5 and 10). A pinion gear 436 (FIG. 4) is fixedly attached to the spindle 426 within a slot 438 (FIG. 10) having a lower surface 440 and is engaged by a rack 442 (FIG. 4) that is secured at its right end to a contacting member 444 which engages the end 354 of the aneroid 350. The member 444 is biased leftwardly against the aneroid end 354 by the spring 434 (which biases the indicating member 432, and thus the pinion gear 436, in a counterclockwise direction, thus biasing the rack 442 in a leftward direction).

Figure 8:
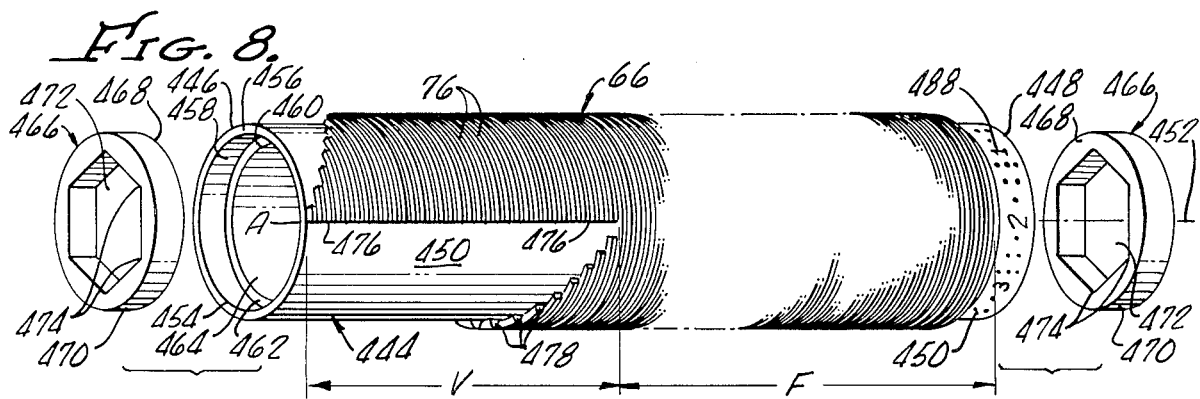
FIG. 8 is an exploded perspective view of an adjustable delaying member of the present invention.

A significant feature of the present invention comprises the novel means for interposing an adjustable time delay between the opening signal and the actual opening of the parachute. A preferred embodiment of this feature will now be more fully described in connection with FIGS. 8 and 9. The translational gear (or delaying member) 66 illustrated in FIG. 8 is, in effect, an assembly of several racks, and includes a tooth or gear-carrying member in the form of a gear or rack body 444 of right circular cylindrical shape, having first and second ends 446 and 448, an exterior surface 450, and a longitudinal axis 452. At each end of the member 444 a longitudinal bore 454 extends inwardly a short distance, forming a relatively thin wall 456 having an inner surface 458. A longitudinal bore 460 having a slightly smaller diameter than those of bores 454 extends between the inward terminations of the bores 454, forming interior shoulders 462 adjacent ends 446 and 448, and an interior surface 464 extending the length of bore 460.

Cylindrical end bearings 466 have diameters slightly larger than those of bores 454 and are axially press-fit into the openings at the ends of member 444 so that inner end surfaces 468 of the bearings 466 abut the interior shoulders 462 and edge surfaces 470 of the bearings 466 contact inner surfaces 458 of the member 444. The bearings 466 are somewhat thicker than the longitudinal extents of the inner surfaces 458 and therefore protrude longitudinally beyond the ends 446, 448 of the member 444 when in place. Each of the end bearings is of an anti-friction polymer currently marketed under the trademark "Teflon" and has an hexagonal opening 472 extending axially therethrough. The hexagonal openings 472 are sized so that their points 474 are disposed radially inwardly of the interior surface 464 when the bearings 466 are in place, and slidably (but nonrotatably) receive the hexagonal guiding member 208 thus mounting the gear 66 in the bore 104.

The member 444 has a variable engageable portion V (hereinafter also referred to as section V) and a fixed engageable portion F (hereinafter also referred to as section F). Sections V and F are defined by longitudinally extending series of gear teeth (or engageable members) 76 that project radially outwardly of the exterior surface 450 of the gear body 444. Along section F, each of the gear teeth 76 extends completely around the circumference of the member 444. However, along section V the gear teeth 76 extend only partially around the circumference of the member 444. Preferably, but not necessarily each tooth is circumferentially continuous. Each of the gear teeth 76 in section V has a first end 476 positioned along reference line A which (for purposes of illustration) extends longitudinally along the exterior surface 450 of the member 444. From reference line A each of the gear teeth 76 along section V extends counterclockwise (as viewed from the left in FIG. 8) continuously around the circumference of the member 44 through a circumferential distance which varies along the length of section V, terminating at a second end 478.

Figure 9:
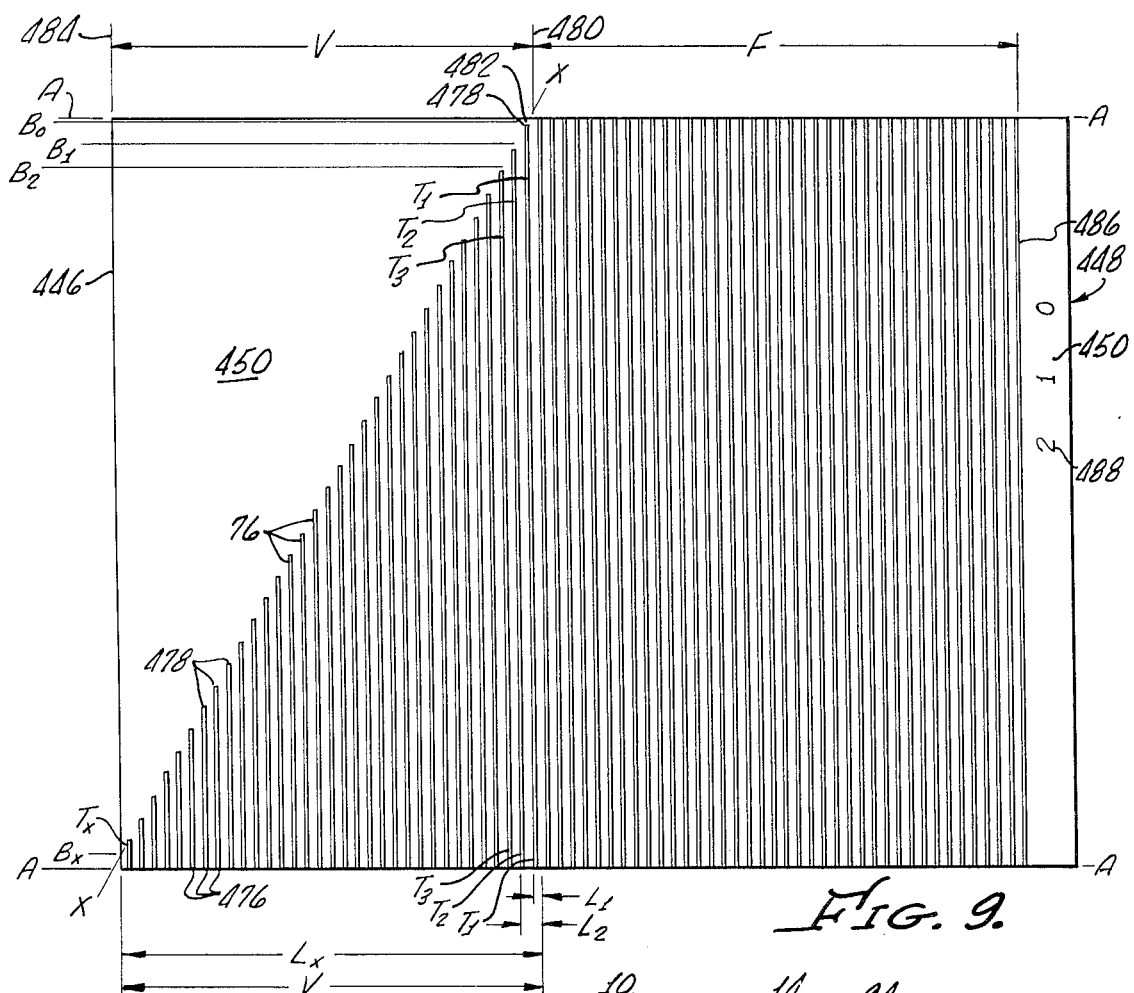
FIG. 9 is a developed view of the exterior surface of the adjustable delaying member of FIG. 8.

FIG. 9 is a developed view of the exterior surface 450 and the gear teeth 76 of the cylindrical gear 66, with the match lines A—A in FIG. 9 corresponding to reference line A in FIG. 8. In FIGS. 8 and 9, it can be seen that at a first end 480 of section V (adjacent a central longitudinal portion of the cylindrical gear 66) the first gear tooth $T_1$ in section V extends almost completely around the cylindrical gear 66, leaving a small gap 482 between the first and second ends 476 and 478 of the gear tooth $T_1$. Progressing toward the second end 484 of section V (adjacent end 446 of the member 444), each successive gear tooth (i.e., $T_2$, $T_3$, etc.) has a length shorter than that of the gear tooth preceding it. The last gear tooth $T_x$ (x being the total number of gear teeth in section V) is the shortest of a series $T_1$ through $T_x$ of the gear teeth 76 in section V and the second ends 478 of the gear teeth 76 in this series lie (in the embodiment illustrated) in an oblique reference line X—X along the exterior surface 450 in FIG. 9.

End 448 of the member 444 extends slightly beyond an outer end 486 of section F, thereby forming a portion of exterior surface 450 having no gear teeth on it. Upon the circumference of this portion of exterior surface are provided time delay reference numerals 488 whose function will be described below.

The effect of the relative orientation and progressively varying lengths of successive gear teeth in section V is that section V has an effective engagement length which varies cyclically around the circumference of the cylindrical gear 66. This cyclical variance is best illustrated in FIG. 9. Along longitudinal reference line $B_0$ (passing through the tooth gap 482) there are no gear teeth in section V which may be engaged (i.e., by another gear). However, along reference line $B_1$, tooth $T_1$ may be engaged and the effective engagement length of section V is $L_1$. Similarly, along reference line $B_2$, gear teeth $T_1$ and $T_2$ may be engaged and the effective engagement length of section V is increased to $L_2$. Finally, along reference line $B_x$, all of the gear teeth $T_1$ through $T_x$ may be engaged and the effective engagement length of section V is at its maximum value of $L_x$. Progressing further around the circumference of the cylindrical gear 66, the starting point (reference line $B_0$) is reached. The effective engagement length is again zero and the cycle is complete. It should be noted that since each of the gear teeth 76 along section F extends completely around the circumference of the cylindrical gear 66, the effective engagement length of section F remains constant around the circumference of the cylindrical gear 66.

During all operation of the device, from uncocked, to cocked, to post-opening signal position, variable gear section V is engaged only by the retarding module gear 68 and fixed section F only by the output gear 64. Thus the gear 66 provides an operative connection between the linking gear train and the retarding module during an adjustable portion of the opening motion.

The translational gear 66 is preferably formed by first forming the gear teeth 76 upon the exterior surface 450 of the gear body 444 so that each of the gear teeth 76 extends completely around the circumference of the gear body. The variable engageable portion V is then formed by removing progressively varying portions of successive teeth along a desired length of the gear body until a developed pattern of gear teeth such as that illustrated in FIG. 9 is obtained. While the aforementioned method is currently preferred, it should be readily apparent to one skilled in the art that the same result may be obtained by attaching to the gear body a plurality of individual gears, each extending longitudinally along the gear body and having various lengths, the gears being spaced circumferentially around the gear body. In fact, under the method currently preferred, the varying length gear teeth in section V form such a circumferential series of gears which have lengths ranging from $L_1$ through $L_x$. Additionally, it should be apparent that the aforementioned method may also be employed using a cylindrical gear body of polygonal or other noncircular cross section or a non-cylindrical or flat tooth-carrying member.

DETAILED DESCRIPTION—OPERATION

Figure 11:
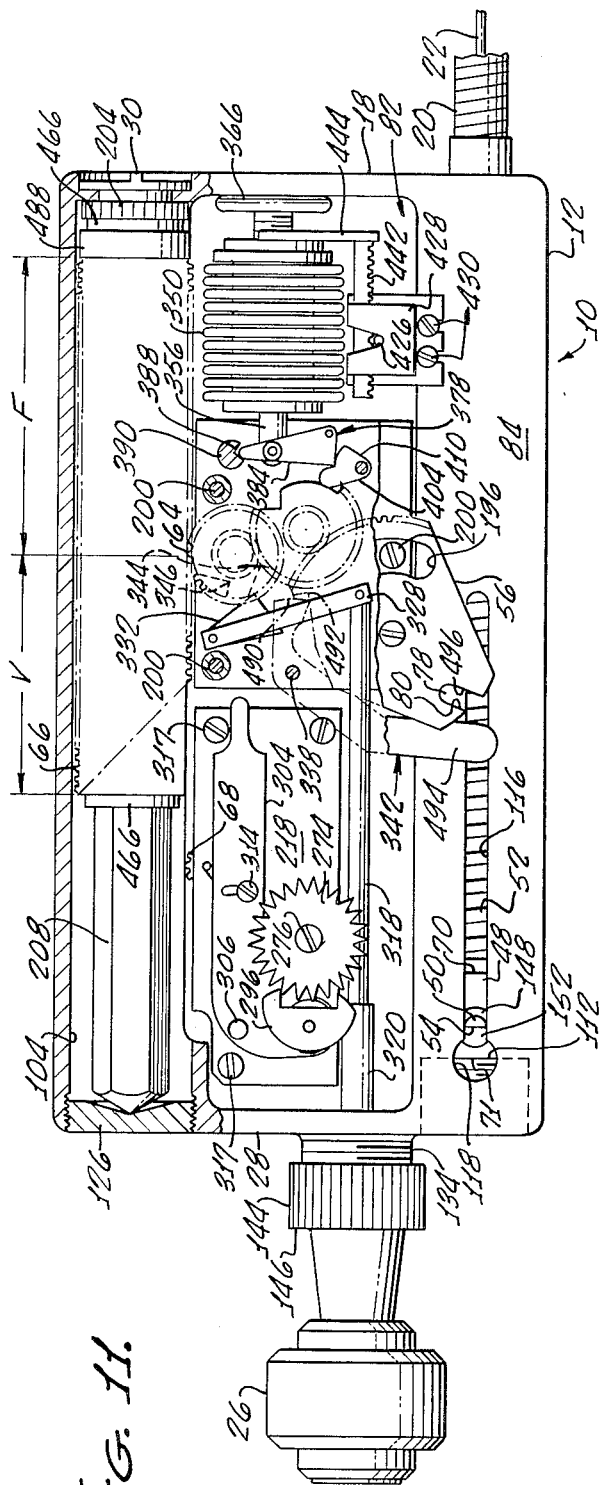
FIG. 11 is a view similar to that of FIG. 5, but with the components of the parachute opener shown in a precocked position.

Referring to FIGS. 3, 4, 5, 11 and 12, the operation and use of the parachute opener 10 will now be more fully described. FIG. 11 shows the parachute opener in a precocked position (with the actuator knob 26 pushed completely in) with the initiator 48 abutting the inner end 112 of the threaded end plug 110. Initiator 48, prior to cocking, is maintained in this position by the main drive spring 52 which is slightly compressed, even in its precocked position (for reasons described below). The initiator pin 50 is slightly to the right of the circular slot end portion 118, its upward withdrawal from the initiator through the slot 116 being precluded by the upper end of the pin carrying member 148 which projects beyond the longitudinal edges of slot 116 as indicated in FIG. 11.

In the precocked position, the translational gear 66 is at the right end of the bore 104, with one of its end bearings 466 abutting the locking member 204, and is engaged at the left end of the fixed length of gear section F by the output gear 64. The variable length gear section V is to the right of the retarding gear train input gear 68 and is not engaged by it. Clockwise rotation of the input gear 56 is precluded by the abutment of gear 66 with the member 204 and, for purposes described below, counterclockwise rotation of input gear 56 is also precluded by the engagement of an end 490 (FIGS. 5 and 11) of the catch member 342 with a notch 492 in the input gear 56 (FIG. 3). An opposite end 494 of the catch member 342 projects over and generally perpendicular to the slot 116 and the open end of the gear slot 78 is directly over the slot 116.

As previously stated, FIGS. 4 and 5 show the components of the parachute opener 10 in a cocked position. During cocking of the parachute opener, by pulling the eyed member 24 outwardly with a knob 26 pushed inwardly as previously described, the components are moved to that position in the following sequence.

As the eyed member 24 is pulled away from the housing 12, the initiator pin 50 (guided by the guiding member 152 in the slot 116) is pulled by the cable 22 toward the input gear 56 against the force of the main spring 52 and contacts the end 494 of the catch member 342, pivoting the catch member in a counterclockwise direction, against the biasing force of a spring 343 (FIG. 5), and disengaging its end 490 from the notch 492 in the input gear 56, thus freeing gear 56 for counterclockwise rotation.

Upon a further movement of the pin 50 to the right, the pin contacts a side 496 of the input gear slot 78, rotating the input gear 56 in a counterclockwise direction. This causes a counterclockwise rotation of the cylindrical member 348 (FIG. 3) and the output gear 64 which in turn drives the cylindrical gear 66 along the guiding member (or adjusting member) 208 to the gear's first (leftmost) position within the bore 104. As the gear 66 is driven leftward during cocking, the input gear 68 of the retarding module is contacted by the gear teeth 76 along an effective engagement length of section V which faces it. During the leftward translational movement of the gear 66, however, the input gear 68 is neither engaged nor rotated by these gear teeth but is merely cammed inwardly by the teeth so that the spindle 226 (FIG. 7) is forced against the curved end 242b of the slot 242 in the upper plate 218. Thus translational movement of the gear 66 is not retarded by the input gear during the cocking process and cocking may be accomplished very rapidly.

When the gear 66 reaches its leftmost position, the engagement member 332 (FIG. 4) on the latch arm 328 engages the notch 344 as previously described and precludes clockwise rotation of the cylindrical member 348 (FIG. 3) thus precluding a clockwise rotation of the output gear 64 and a rightward translational movement of the cylindrical gear 66. When the eyed member 24 is then released, the flat side 154 of the initiator pin 50 is brought into abutment (by the main drive spring 52) with the side 80 of the gear slot 78, the pin 50 being locked in the cocked position by the locking of the linking gear train as previously described.

When the parachute opener is above the predetermined lockout altitude, a clockwise rotation of the linking module input gear 56 from its cocked position (and thus an opening of the parachute) is precluded by the barometric lockout mechanism as previously described—even if the knob 26 is pulled outwardly and the engagement member 332 is disengaged from the notch 344 in the cylindrical member 348. Above such predetermined altitude, the aneroid pin 356 is extended to the left (FIG. 4) by axial expansion of the aneroid 350 which in turn pivots the first locking member 378 in a counterclockwise direction about pin 180 to a position where its surface 384 may be engaged by surface 410 of the second locking member 404 as previously described—locking the linking gear train and precluding a releasing movement of the initiator 48.

However, when the parachute opener is below the lockout altitude, the pin 356 is retracted by automatic contraction of the aneroid 350 which pivots the first locking member 378 about its pin 180 in a clockwise direction. This moves the surface 384 past the surface 410 on the second locking member 404 and permits a clockwise rotation of the second locking member and thus permitting clockwise rotation of the input gear 56 (with the knob 26 pulled outwardly). By rotating the dial 34 and adjusting the position of the aneroid 350 within the housing recess (the aneroid being moved inwardly or outwardly along the adjusting screw 364 as dial 34 is rotated), the lockout altitude may be selectively varied.

For example, a clockwise rotation of the adjusting screw 364 (FIG. 4) causes the aneroid 350 to be shifted toward the right. This rightward shifting increases the distance through which the aneroid pin 356 must be extended to the left by expansion of the aneroid 350 (i.e., by a lowering of ambient pressure as the altitude increases) to preclude clockwise rotation of the input gear 56 as previously described. Thus, a rightward adjustment of the aneroid 350 increases the predetermined altitude above which clockwise rotation of the input gear 56 (and thus an opening of the parachute) is precluded.

Altitude indication numerals 498 (FIG. 5) are provided on the upper surface of the altitude indicating member 432. As the aneroid 350 is adjusted to the right, the altitude indicating rack 442 (FIG. 4) is moved to the right by the contacting member 444, causing a clockwise rotation of the altitude indicating member 432. The lockout altitude selected may be viewed through the viewing window 36 in the cover plate 14 which, as can be seen in FIG. 5, is positioned above the altitude indicating numerals 498 which are correlated to such adjustments of the aneroid's position. Changes in ambient pressure are rapidly transmitted to the aneroid 350 through a filter 500 (FIG. 1) in the cover plate 14.

At altitudes above the lockout altitude, the spindle 390 (FIG. 4) and the leak indicating member 396 (FIG. 5) are rotated in a clockwise direction (by the end 382 of the first locking member 378 which engages the notch 388 in the spindle 390) positioning section 400 of member 396 beneath a viewing window 502 in the cover plate 14 (FIGS. 1 and 5). When the apparatus is at ground level (and the lockout altitude is substantially above zero) an appearance of section 400 of the leak indicator (painted red in the embodiment illustrated) below the viewing window 502 indicates a leak in the aneroid 350 and a need for replacement thereof.

FIG. 12 illustrates the components shortly after the actuator knob 26 has been pulled completely out (i.e., the parachute opening signal) and with the aneroid 350 in a retracted position (i.e., with the parachute opener below the selected lockout altitude and thus freed to operate in response to the opening signal). With the engaging member 332 disengaged from the notch 344 and the second locking member 404 being freed for clockwise rotation (by the clockwise rotation of the first locking member 378 caused by retraction of the aneroid pin 356) the main drive spring 52 has driven the input gear 56 in a clockwise direction past the cocked position shown in FIGS. 4 and 5. This clockwise rotation rotates the output gear 64 in a clockwise direction, driving the cylindrical gear 66 to the right, toward its second position.

The rightward movement of the cylindrical gear 66 forces the spindle 226 against end 242a of slot 242 (FIG. 7) and causes the gear teeth 76 in section V to engage and rotate the retarding module input gear 68 along and through an effective engagement length of section V which faces it. The input gear 68 is constrained to rotate at a predetermined rate as selected by a previous adjustment of the bell crank lever 304. The movement of the translational gear toward its second position is thud limited to a fixed, preselected retarded rate during its engagement by the input gear 68.

Since the cylindrical gear 66 is coupled (through the linking gear train) to the initiator 48 for conjoint movement, the releasing (i.e., leftward) movement of the initiator is also retarded during the interengagement between the cylindrical gear and the input gear 68. When the input gear 68 reaches the left end of the effective engagement length of section V which faces it, its restraint on the translational movement of the cylindrical gear is removed and the drive spring 52 rapidly drives the initiator 48 to the left and the cylindrical gear (still engaged by the output gear 64 along section F) to the right. Without the restraint imposed by the retarding gear train the remainder of the motion of both the cylindrical gear 66 and the input gear 56 occurs substantially instanteously. The translational gear 66 is driven against the cylindrical locking member 204 (i.e., to its second position) at essentially the same instant that the input gear 56 reaches the position illustrated in FIG. 11. When the input gear 56 reaches that position, the initiator pin 50 is released from the gear slot 78 allowing the initator 48 to complete its releasing motion with the sharp jerk needed to open the parachute.

It can be seen that the position at which the input gear 56 releases the initiator pin 50 is the same position in which it is initially engaged by the pin during cocking. Thus it is important that the input gear 56 be maintained in that position subsequent to its release of the pin 50 and prior to recocking so that the pin 50 initially contacts slot side 496 on cocking. For example, if, prior to recocking, input gear 56 were to be rotated counterclockwise past the position shown in FIG. 11 (further clockwise rotation being precluded by the cylindrical gear 66 in its second position) the pin 50 would not re-engage the gear slot 78 and recocking would be precluded. A force tending to cause such misalignment of the gear slot 78 relative to the released initiator pin 50 is that resulting from the rapid attainment of the second position by the translational gear. When the gear 66 strikes the cylindrical locking member 204 (FIG. 4) it naturally tends to "bounce" back toward its first position (i.e., to the left in FIG. 4). Since the gear 66 is continuously engaged (along section F) by the output gear 64 this in turn tends to rotate the input gear 56 counterclockwise and cause such slot misalignment. The misalignment is precluded, however, by the catch member 342 (which functions as anti-bounce means). When the initiator pin 50 is released from the gear slot 78 the catch member 342 is freed for clockwise rotation by its spring 343 (FIG. 5), its end 490 quickly engaging gear notch 492 in the input gear 56 and substantially precluding (via the linking gear train) such leftward gear bounce and further counterclockwise rotation of the input gear 56.

It can be seen in FIG. 4 that the dotted line release position of the initiator 48 (i.e., the position at which the release cable 22 has been pulled inwardly to an extent sufficient to open the parachute) is slightly to the right of its precocked position indicated in FIG. 11. More specifically, in such release position the end 71 of the initiator 48 is slightly to the right (in FIG. 4) of the inner end 112 of the end plug 110 (approximately one eighth to one quarter inch in the embodiment described herein). This is a safety measure designed to compensate for possible minor variations in ripcord location, attachment of the parachute opener, etc.—i.e., to assure that when the initiator 48 strikes the end plug 110 (FIG. 4) the cable travel has been more than sufficient to open the parachute.

As previously stated, during the initial portion of the movement of the translational gear toward its second position, the rate of its motion may be retarded to a selectively variable degree by simply adjusting the escapement mechanism lever 304, thus interposing an adjustable minimum time delay between the parachute opening signal and the deployment of the parachute. The minimum time delay, of course, occurs when the parachute opener is activated below its predeterminated lockout altitude. When it is activated above that altitude (for example, when the parachute's wearer pulls the actuator knob as he bails out of an aircraft above the lockout altitude) such time delay begins only when the parachute opener is below that altitude. The time delay is directly proportional not only to the selected retarding force of the retarding gear train on the translational gear but to the effective engagement length of gear section V (which faces input gear 68) as well. By rotating adjustment dial 30 (FIG. 4) to an adjusted rotational position, as previously described, the effective engagement length of section V may be selectively varied—in effect selecting a "different" gear for engagement by retarding module input gear 68. Stated otherwise, the total time delay is inversely proportional to the selected rotational rate of the gears in the retarding module and directly proportional to the chosen effective engagement length of the translational gear section V. Thus the available adjustment of the delay period is both more precise (by adjustment of either rate or length) and of greater range (by adjustment of both) than that available in most, if not all, prior art parachute opening devices.

Because of the adjustment capability of the retarding module a wide variety of time delay ranges is available. As an example, let it be assumed that the particular retarding module used allows the time delay between adjacent gear teeth in section V to be varied from zero to one second and that section V has 30 teeth, each of a unique circumferential extent (thus, in effect, having 30 separate gears or gear sections of different lengths available). If it is desired to have a zero to fifteen second time delay range the escapement lever is simply adjusted for a time delay of one half second between adjacent gear teeth in section V. The time delay numerals (i.e., 0 to 15) 488 (FIG. 5) are then suitably imprinted or otherwise placed on the right end of the exterior gear surface 450 (FIG. 8) and oriented with respect to the cylindrical gear section V so that, for instance, when the numeral "5" appears in the viewing window 32 (FIG. 5) when the parachute opener is cocked, the section V effective engagement length engageable by the input gear 68 is ten teeth long (i.e., a five second time delay).

As previously stated, the translational gear may be rotated (by dial 30) to a desired position in which it is releasably locked by cylindrical locking member 204 and detent 212 (FIG. 10). Member 204 has one notch 206 for every tooth in gear section V (and thus four for each time delay increment). Similarly, if a different time delay range is desired, the escapement lever is readjusted and the time delay numerals are replaced with ones corresponding to the new range. A nontoothed section 504 (FIGS. 3 and 4) on the output gear 64 is directly opposite the time delay numerals when the parachute opener is cocked, thus precluding marring of the numerals by the teeth on gear 64.

Once the time delay range is established as described above, the parachute opener is calibrated and otherwise readied for use in the following manner. It is first cocked (with the actuator knob pushed fully inwardly) but the eyed member 24 is not attached to the parachute ripcord. Dial 30 is then adjusted to select the desired time delay (i.e., to select the effective engagement length of gear section V) and dial 34 is adjusted to select a lockout altitude higher than the altitude at which the parachute opener is being calibrated (which renders the barometric lockout mechanism inoperative). The actuator knob is then pulled out and the actual time delay is measured and compared to the selected one. If calibration is needed the cover plate is removed and the escapement lever is adjusted to increase or decrease the actual delay. The parachute opener is then recocked and the time delay test repeated until satisfactory accuracy is achieved. The cover plate is then reattached.

When calibration is complete (or before such time delay calibration if desired) the barometric lockout mechanism may be checked for proper functioning in two ways. With the lockout altitude set substantially higher than the test site altitude, viewing window 502 (FIG. 5) is visually checked. An appearance therein of the red section 400 of the leak in the aneroid 350 (as previously stated) and thus a need to replace it. If the test site altitude is somewhat above sea level (fifty feet is normally sufficient) the lockout altitude is then set to zero and the parachute opener is cocked. If the lockout mechanism is functioning properly, the actuator knob may be pulled outwardly without resulting movement of the release cable or translational gear. When these tests are complete the parachute opener is ready to be adjusted to the desired time delay and altitude settings, cocked, and attached to the ripcord and harness as previously described.

Because of the wise adjustment range available in both the time delay and barometric lockout features of the parachute opener (which as previously stated, are independently adjustable) it is readily adaptable to a great variety of situations calling for diverse combinations of time delays and lockout altitude settings. At the other end of the spectrum, the parachute opener may be made to function as a time delay-only device below the maximum available lockout setting (by setting the altitude adjustment at its maximum setting) or as a barometric lockout-only device (by setting the time delay adjustment at zero).

In addition to the great adjustment flexibility of the parachute opener described and illustrated herein, several very desirable safety features are built into it. For instance, by merely glancing at the time delay viewing window 32 it can be ascertained whether or not the parachute opener is cocked (i.e., whether or not the translational gear is in its first position)—if no numbers are visible therein, the parachute opener is not cocked. As previously stated, an appearance of the red section 400 in viewing window 502 when the parachute opener is substantially below the selected lockout altitude indicates an aneroid leak.

Additionally, a threaded insert 506 (FIG. 1) in the cover plate 14 is positioned directly above the circular end portion 118 of the guide slot 116 (FIG. 11). Removal of the insert 506 provides for quick inspection of the initiator pin 50 (when in its precocked position) without removing the cover plate 14. If it is desired to replace pin 50 (or if it is discovered that pin 50 has been inadvertently removed or is otherwise missing) end plug 110 is loosened until the pin carrying member 148 (FIG. 3) is moved (by the slightly compressed main drive spring 52) directly under the circular opening 118 (FIG. 11), allowing removal and replacement of the pin 50 without removal of cover plate 14. With the new pin in place end plug 110 is retightened, moving the new pin to the normal precocked position, and the insert 506 is replaced. It should be noted that this simple pin replacement may be accomplished by a relatively unskilled technician without exposing other important components of the parachute opener during such replacement.

Another important and desirable safety feature of the parachute opener described herein is that if the actuator knob is inadvertently pulled outwardly when the parachute opener is cocked and below its selected lockout altitude, the parachute opening process may usually be stopped (depending on the length of the time delay selected) by quickly pushing the knob back in (i.e., a movement stopping signal) so that the second notch 346 (FIG. 4) in the cylindrical member 348 may be engaged by the engagement member 332 (thus again locking the linking gear train) as the member 348 is rotated clockwise by the translational gear. This precludes release of the initiator pin 50 and the parachute opener may be recocked by simply pulling the eyed member 24 back to its fully extended position (at which position notch 344 is reengaged by engagement member 332).

Despite its compact size, many components and wide adjustment capability, the parachute opener described and illustrated herein is surprisingly simple to assemble, repair and adjust due to its modular construction—unlike many of its prior art mechanical counterparts. (This modular construction also greatly reduces the manufacturing cost of the apparatus). It can be seen, for instance, that the entire retarding module can be removed as a unitary assembly simply by removing the cover plate 14 and loosening the retarding module fastening screws 317 (FIG. 5). In a similar manner the entire linking module can be removed as a unitary assembly and repaired or simply replaced. Access to and repair of the other major components is equally uncomplicated. Also, and importantly, the parachute opener has proven to be substantially lighter in weight than many of th prior art mechanical devices.

Additionally, once the parachute oopener is calibrated as previously described, it may be periodically tested without the need to remove the cover plate and replace or adjust internal components after each test—unlike explosive type time delay devices and many mechanical time delay devices. With the exception of time delay calibration, the parachute opener's time delay and altitude adjustments are all conveniently located outside the housing and require little if any skill to use. A quick look at the viewing windows verifies both that the apparatus is ready to use and under which of its widely adjustable time delay and altitude parameters it will operate when actuated.

The foregoing detailed description is to be clearly understood as given by way of illustration and example only, the spirit and scope of this invention being limited solely by the appended clams.

What is claimed is:

1. A parachute opener comprising:
   (a) a support;
   (b) opening means carried by said support for movement from a cocked position to a release position for opening a parachute upon said movement to said release position;
   (c) latch means carried by said support for releasably locking said opening means in said cocked position and for unlocking said opening means in response to a parachute opening signal;
   (d) means for driving said opening means to said release position; and
   (e) adjustable time delay means carried by said support for interposing a time delay of predetermined magnitude between the start of said unlocking and the attainment of said release position by said opening means, said adjustable time delay means comprising:
   an adjustable delaying member carried by said support for translational movement along a longitudinal axis of said delaying member,
      said delaying member having a variable engageable portion thereon defined by a longitudinally extending series of engagement members, said variable engageable portion having an adjustable effective engagement length;
   retarding means carried by said support for engaging said engagement members through said effective engagement length during a portion of said translational movement of said delaying member to retard the rate of said translational movement;
   shifting means for shifting said delaying member relative to said retarding means to selectively vary said effective engagement length; and
   linking means for coupling said opening means and said delaying members for conjoint movement,
      whereby said retarding means restrains motion of said delaying member, linking means and opening means during its engagement with said engagement members and releases its restraint thereof when disengaged from said engagement members.

2. A parachute opener a recited in claim 1 further comprising barometric lockout means carried by said support for precluding attainment of said release position by said opening means when said parachute opener is above a predetermined lockout altitude.

3. A parachute opener as recited in claim 2 further comprising means for selectively varying said lockout altitude.

4. A parachute opener as recited in claim 2 wherein said barometric lockout means include an aneroid barometer and wherein said parachute opener further comprises means for indicating a leak in said aneroid barometer.

5. A parachute opener as recited in claim 1 wherein said adjustable delaying member is a cylinder having a longitudinally extending exterior surface and wherein said engagement members are teeth affixed thereto and projecting radially outwardly therefrom,
   said teeth extending in the same angular direction from first to second ends thereof through varying lengths extending around portions of the circumference of said cylinder,
      said first ends of said teeth being longitudinally aligned with each other.

6. A parachute opener as recited in claim 5 wherein a first end of said variable engageable portion is adjacent an inner longitudinal portion of said cylinder, wherein a second end of said variable engageable portion is adjacent an end of said cylinder, and wherein the circumferential lengths of successive teeth decrease progressively along the length of said variable engageable portion from said first end thereof to said second end thereof.

7. A parachute opener as recited in claim 5 wherein said shifting means include an elongated guiding member rotatably mounted to said support, said cylinder further having an axial passage slidably and nonrotatably receiving said guiding member.

8. A parachute opener as recited in claim 7 wherein said shifting means further include means for rotating said guiding member about said longitudinal axis to a selected rotational position with respect to said retarding means.

9. A parachute opener as recited in claim 1 wherein said retarding means comprise:
a retarding gear train having an input gear and an output gear,
said input gear sequentially engaging and being rotated by at least some of said engagement members during a portion of said translational movement, and
means for applying a rotation retarding force to sid output gear during rotation thereof.

10. A parachute opener as recited in claim 9 wherein said rotation retarding force means include an adjustable escapement member adapted to contact and apply a selectively variable retarding force to said output gear, whereby the rate of rotation of said input gear may be selectively varied.

11. A parachute opener as recited in claim 1 wherein said retarding means comprise a retarding module removably secured to said support as a unitary assembly.

12. A parachute opener as recited in claim 1 wherein said delaying member further has a fixed engageable portion thereon defined by a longitudinally extending series of engagement members and having a length unaffected by said shifting of said delaying member, and wherein said linking means comprise:
a linking gear train carried by said support and having input and output gears,
said output gear being adapted to sequentially engage said engagement members of said fixed engageable portion and drive said delaying member through said translational movement, and
said input gear engaging said opening means in said cocked position whereby upon said unlocking of said opening means and movement thereof toward said release position said input gear is rotated by said opening means.

13. A parachute opener as recited in claim 12 wherein said linking gear train includes means for driving said delaying member completely through its translational movement from a first position to a second position during an initial portion of said movement of said opening means from said cocked position to said release position, and wherein said input gear is connected to release said opening means substantially simultaneously with the attainment of said second position by said delaying member.

14. A parachute opener as recited in claim 13 wherein said delaying member abuts said support when in said second position and wherein said parachute opener further includes anti-bounce means for restraining said delaying member from bouncing back toward said first position upon attaining said second position.

15. A parachute opener as recited in claim 14 wherein said input gear is rotated in a first direction by said opening means during said initial portion of said movement thereof from said cocked position to said release position, and wherein said anti-bounce means include catch means for engaging said input gear when the same releases said opening means and for restraining further rotation of said input gear in said first direction.

16. A parachute opener as recited in claim 15 including means for disengaging said catch means from said input gear as said opening means are moved to said cocked position and wherein said input gear is positioned to engage said opening means subsequent to the disengagement of said catch means and to be rotated by said opening means in a direction opposite said first direction to cause said output gear to drive said delaying member to said first position thereof.

17. A parachute opener as recited in claim 1 further comprising means responsive to a movement-stopping signal for stopping said movement of said opening means from said cocked position to said release position prior to attainment of said release position by said opening means.

18. A parachute opener as recited in claim 1 wherein said linking means comprises a linking module removably secured to said support as a unitary assembly.

19. A time-delayed parachute opener comprising:
(a) a support;
(b) spring-loaded opening means carried by said support for spring-driven movement from a cocked position to a release position for opening said parachute upon attainment of said release position;
(c) latch means carried by said support for releasably locking said opening means in said cocked position and, responsive to a parachute opening signal, for unlocking said opening means;
(d) a time delay member carried by said support for translational movement along an axis of said time delay member,
said time delay member having a variable engageable portion thereon having a plurality of effective engagement lengths parallel to said axis;
(e) linking means for coupling said opening means and said time delay member for conjoint movement;
(f) retarding means carried by said support for engaging said variable engageable portion along and through a selected one of said effective engagement lengths thereof during a portion of said translational movement of said time delay member and for applying a movement retarding force thereto;
(g) shifting means carried by said support for shifting said time delay member relative to said retarding means to select one of said plurality of effective engagement lengths for engagement by said retarding means,
whereby a selectively variable time delay may be interposed between said parachute opening signal and the attainment of said release position by said opening means.

20. A time-delayed parachute opener as recited in claim 19 wherein said retarding means include means for selectively varying said movement retarding force, whereby the time delay associated with one of said effective engagement lengths may be selectively varied.

21. A time-delayed parachute opener as recited in claim 19 further comprising barometric lockout means for precluding attainment of said release position by said opening means unless said parachute opener is below a predetermined lockout altitude.

22. A time-delayed parachute opener as recited in claim 21 wherein one of said effective engagement lengths is zero, whereby said parachute opener may be used as a barometric lockout-only device if desired.

23. An apparatus for opening a parachute, said apparatus comprising:
(a) a housing;
(b) a spring-loaded release cable carried by said housing for spring-driven movement therein from a cocked position to a release position,
said release cable being adapted to open said parachute upon attainment of said release position;

(c) latch means carried by said housing for releasably locking said release cable in said cocked position and for unlocking said cable in response to a parachute opening signal;

(d) an elongated cylindrical translational gear mounted within said housing for rotation and for translational movement along a longitudinal axis of said gear, said gear having a variable engageable portion thereon defined by a longitudinally extending series of teeth projecting radially outwardly of said gear, said teeth extending circumferentially through varying lengths around said gear and defining an effective engagement length of said engageable portion that varies around the circumference of said engageable portion;

(e) linking means carried by said housing for coupling said release cable and gear for conjoint movement;

(f) retarding means carried by said housing for engaging said gear along and through an effective engagement length of said variable engagement portion thereof during a portion of said translational movement and for retarding said translational movement during engagement therewith; and (g) shifting means carried by said housing for rotating said gear to select an effective engagement length through which said translational movement is retarded by said retarding means, whereby a time delay of a magnitude related directly to the effective engagement length selected may be interposed between said parachute opening signal and the opening of said parachute by said release cable.

24. An apparatus as recited in claim 23 wherein said retarding means include a retarding member adapted to selectively vary the degree of retardation of said translational movement of said gear by said retarding means, whereby the time, during said translational movement, of engagement between said retarding means and a selected effective engagement length may be selectively varied.

25. An apparatus as recited in claim 24 further comprising adjustable barometric lockout means carried by said housing for precluding movement of said release cable from said cocked position to said release position when said apparatus is above a predetermined lockout altitude.

26. An apparatus as recited in claim 23 wherein said linking means include a linking gear train and said latch means include an engagement member adapted to releasably lock said linking gear train when said release cable is in said cocked position.

27. An apparatus as recited in claim 23 wherein said translational gear is rapidly moved from a first position to a second position against said housing during movement of said release cable from said cocked position to said release position and wherein said apparatus further comprises anti-bounce means for restraining said gear from bouncing toward said first position after attaining said second position.

28. An apparatus as recited in claim 23 wherein said linking means are adapted to uncouple said release cable from said translational gear during a final portion of said spring-driven movement of said release cable to said release position and to recouple said gear and cable upon a movement of said cable back to said cocked position.

29. An apparatus for opening a parachute, said apparatus comprising:
(a) a support;
(b) a spring-loaded parachute release cable carried by said support for spring-driven movement from a cocked position to a release position and adapted to open said parachute upon reaching said release position;
(c) an engagement member carried by said support and adapted to releasably lock said parachute release cable in said cocked position;
(d) a retarding gear train carried by said support and having an input gear and an output gear;
(e) a delaying member coupled with said parachute release cable for conjoint movement therewith and carried by said support for translational movement past said input gear along a longitudinal axis of said delaying member, said delaying member having thereon a variable engageable portion defined by a longitudinally extending series of engagement members and having an effective engagement length that varies laterally of said delaying member, said effective engagement length of said engageable portion being in engagement with said input gear during a portion of said translational movement;

(f) adjustment means carried by said support for shifting said delaying member relative to said input gear and selectively varying said effective engagement length; and (g) means for retarding the rate of rotation of said output gear.

30. An adjustable time-delayed mechanism for opening a parachute, said mechanism comprising:
(a) a spring-driven opening initiator mounted for motion between a cocked position and a release position;
(b) a parachute release member connected to said initiator for motion therewith and adapted to open said parachute upon attainment of said release position by said initiator;
(c) a translational gear slidably mounted for motion in a first direction between first and second gear positions, said gear having teeth extending in a second direction;
(d) gearing connected to and between said initiator and gear to drive said gear to said second position in response to motion of said initiator toward said release position;
(e) latch means for releasably retaining said initiator in said cocked position by releasably locking said gearing;
(f) means engageable with said gear along an effective length of said gear for retarding motion of said gear toward said second position; and
(g) means for shifting said gear in said second direction to vary the effective length of said gear.

31. The mechanism of claim 30 further comprising means for shifting said initiator to a cocked position and shifting said gear to said first position, and means for effectively disengaging said retarding means upon movement of said gear to said first position.

32. An adjustable time-delayed mechanism for opening a parachute, said mechanism comprising:
a spring-driven opening initiator mounted for motion between a cocked position and a release position;

(b) a parachute release member connected to said initiator for motion therewith and adapted to open said parachute upon attainment of said release position by said initiator;

(c) a translational gear slidably mounted for motion between first and second gear positions;

(d) gearing connected to and between said initiator and gear to drive said gear to said second position in response to motion of said initiator toward said release position;

(e) latch means for releasably retaining said initiator in said cocked position by releasably locking said gearing;

(f) means engageable with said gear along an effective length of said gear for retarding motion of said gear toward said second position; and (g) means for varying the effective length of said gear, said gear comprising a plurality of effective gear components of mutually different lengths, said means for varying effective gear length comprising means for operatively engaging said retarding means with a different one of said gear components.

33. The mechanism of claim 32 wherein said means for retarding motion of said gear comprise means for selectively varying the rate of motion of said gear, whereby the delay of said mechanism may be adjusted by varying the effective length of said gear, or varying the rate of motion thereof, or both.

34. The mechanism of claim 33 wherein said retarding means comprise a train of gears including an escapement cam mounted for oscillatory pivotal motion about a shiftable pivot axis and engaged with a gear of said train of gears, and wherein said means for varying the rate of motion include a lever pivoted about an axis spaced from said shiftable pivot axis and having an arm connected to said shiftable pivot axis to move said pivot axis and escapement cam relative to said gear upon pivotal motion of said lever.

35. In a parachute deployment device having a spring actuated parachute opening member of which movement to a parachute opening position is delayed by a rack connected to the opening member by gearing, an improved and adjustable rack comprising:

(a) a rack body mounted for motion in a longitudinal direction, and (b) a plurality of laterally extending rack teeth on said body mutually spaced in said longitudinal direction, the teeth of a group of teeth relatively closer to one end of said plurality of teeth extending for different lateral distances than teeth of said group that are further from said one end, whereby said rack has an effective length of rack teeth that varies laterally of said rack body.

36. The device of claim 35 including means for mounting said rack for adjustable lateral displacement relative to said gearing.

37. The device of claim 36 wherein said rack body comprises a circular cylinder, wherein said teeth extend circumferentially around said cylinder, and wherein said teeth are mutually spaced along the length of said cylinder.

38. In a mechanical time delay device for automatically opening a parachute, said device having a rack coupled to spring-driven parachute opening means for conjoint movement in a first direction toward a position at which said parachute is opened by said opening means and past retarding means which, during said conjoint movement, engage said rack along the length thereof and retard its motion, thereby retarding motion of said opening means and creating said time delay, the improvement wherein said rack has an effective engagement length that varies transversely of said direction, said improvement further comprising means for shifting said rack transversely of said direction to selectively vary said effective engagement length, thereby selectively varying the time of engagement between said retarding means and rack during said conjoint movement.

39. In a mechanical time delay device for automatically opening a parachute, said device having a rack coupled to spring-driven parachute opening means for conjoint movement toward a position at which said parachute is opened by said opening means and past retarding means which, during said conjoint movement, engage said rack along the length thereof and retard its motion, thereby retarding motion of said opening means and creating said time delay, the improvement wherein said rack has an effective engagement length that varies laterally of the rack, said improvement further comprising means for shifting said rack to selectively vary said effective engagement length, thereby selectively varying the time of engagement between said retarding means and rack during said conjoint movement, said rack being cylindrical and said effective engagement length varying circumferentially around said rack.

40. In a mechanical time delay device for automatically opening a parachute, said device having a rack coupled to spring-driven parachute opening means for conjoint movement toward a position at which said parachute is opened by said opening means and past retarding means which, during said conjoint movement, engage said rack along the length thereof and retard its motion, thereby retarding motion of said opening means and creating said time delay, the improvement wherein said rack has an effective engagement length that varies laterally of the rack, said improvement further comprising means for shifting said rack to selectively vary said effective engagement length, thereby selectively varying the time of engagement between said retarding means and rack during said conjoint movement, and means for adjusting said retarding means to vary the time of engagement between said retarding means and a selected effective engagement.

* * * * *